US011050996B2

(12) United States Patent
Ha et al.

(10) Patent No.: US 11,050,996 B2
(45) Date of Patent: Jun. 29, 2021

(54) SYSTEMS AND METHOD FOR GPU BASED VIRTUAL REALITY VIDEO STREAMING SERVER

(71) Applicant: AlcaCruz Inc., San Mateo, CA (US)

(72) Inventors: SangYoo Ha, San Mateo, CA (US); Salomon Lee, San Mateo, CA (US)

(73) Assignee: AlcaCruz Inc., Foster City, CA (US)

( * ) Notice: Subject to any disclaimer, the term of this patent is extended or adjusted under 35 U.S.C. 154(b) by 0 days.

(21) Appl. No.: 16/868,974

(22) Filed: May 7, 2020

(65) Prior Publication Data

US 2020/0267370 A1    Aug. 20, 2020

Related U.S. Application Data

(63) Continuation of application No. 16/391,486, filed on Apr. 23, 2019, now Pat. No. 10,904,511, which is a
(Continued)

(51) Int. Cl.
*H04N 13/194* (2018.01)
*H04N 13/111* (2018.01)
(Continued)

(52) U.S. Cl.
CPC .......... *H04N 13/194* (2018.05); *G06F 3/147* (2013.01); *G06T 1/20* (2013.01); *G06T 19/006* (2013.01);
(Continued)

(58) Field of Classification Search
CPC .............. G06T 15/005; G06T 2200/28; G06T 2210/52; G06F 3/14; G06F 3/1454;
(Continued)

(56) References Cited

U.S. PATENT DOCUMENTS 5,185,667 A    2/1993    Zimmerman
5,880,734 A    3/1999    Light
(Continued)

FOREIGN PATENT DOCUMENTS

CN    101000461    7/2007
CN    101002479    7/2007
(Continued)

OTHER PUBLICATIONS

"Chinese Application Serial No. 201780013448.9, Office Action dated Apr. 2, 2020", W English Translation, 17 pgs.
(Continued)

*Primary Examiner* — Farhan Mahmud
(74) *Attorney, Agent, or Firm* — Schwegman Lundberg & Woessner, P.A.

(57) ABSTRACT

Systems and methods of processing and streaming a virtual reality video using a graphics processing unit (GPU) are provided. A video server is configured to cause a processor to read, from a video data source, source video data including multiple spherical image frame data and store the source video data in a first memory. The video server is further configured to cause the GPU to convert, in response to storing first spherical image frame data in a first frame buffer of a second memory, the first spherical image frame data to first equirectangular image frame data that correspond to a portion of spherical image represented by the first spherical image frame data, encode the converted first equirectangular image frame data and store the encoded first equirectangular image frame data in an encoded frame buffer of the second memory.

20 Claims, 15 Drawing Sheets

Related U.S. Application Data continuation of application No. 15/094,336, filed on Apr. 8, 2016, now Pat. No. 10,334,224.

(60) Provisional application No. 62/297,394, filed on Feb. 19, 2016.

(51) Int. Cl.
| | |
|---|---|
| H04N 13/161 | (2018.01) |
| G06F 3/147 | (2006.01) |
| G09G 5/36 | (2006.01) |
| G09G 5/391 | (2006.01) |
| H04N 21/00 | (2011.01) |
| H04N 19/85 | (2014.01) |
| G06T 19/00 | (2011.01) |
| H04L 29/06 | (2006.01) |
| G06T 1/20 | (2006.01) |
| H04N 5/232 | (2006.01) |
| H04N 19/61 | (2014.01) |
| G09G 5/14 | (2006.01) |

(52) U.S. Cl.
CPC .............. G09G 5/363 (2013.01); G09G 5/391 (2013.01); H04L 65/601 (2013.01); H04L 65/602 (2013.01); H04L 65/607 (2013.01); H04L 67/42 (2013.01); H04N 5/23238 (2013.01); H04N 13/111 (2018.05); H04N 13/161 (2018.05); H04N 19/85 (2014.11); H04N 21/00 (2013.01); G09G 5/14 (2013.01); G09G 2310/04 (2013.01); G09G 2340/045 (2013.01); G09G 2350/00 (2013.01); G09G 2354/00 (2013.01); G09G 2360/121 (2013.01); G09G 2360/18 (2013.01); G09G 2370/022 (2013.01); H04N 19/61 (2014.11)

(58) Field of Classification Search
CPC ...... H04N 19/44; H04N 19/42; H04N 19/172; H04N 19/46; A63F 13/355; A63F 13/12; G09G 5/14; G09G 2360/06
See application file for complete search history.

(56) References Cited

U.S. PATENT DOCUMENTS

| | | | |
|---|---|---|---|
| 6,043,837 | A | 3/2000 | Driscoll, Jr. et al. |
| 7,908,462 | B2 | 3/2011 | Sung |
| 8,747,116 | B2 | 6/2014 | Zboray et al. |
| 8,851,896 | B2 | 10/2014 | Wallace et al. |
| 9,912,717 | B2 | 3/2018 | Ha et al. |
| 10,334,224 | B2 | 6/2019 | Ha et al. |
| 10,904,511 | B2 | 1/2021 | Ha et al. |
| 10,939,087 | B2 | 3/2021 | Ha et al. |
| 2005/0007483 | A1 | 1/2005 | Zimmermann et al. |
| 2011/0296318 | A1 | 12/2011 | Takayama et al. |
| 2012/0062444 | A1 | 3/2012 | Cok et al. |
| 2012/0092348 | A1 | 4/2012 | Mccutchen |
| 2012/0212491 | A1 | 8/2012 | Hager |
| 2013/0141523 | A1 | 6/2013 | Banta et al. |
| 2014/0184475 | A1 | 7/2014 | Tantos et al. |
| 2014/0341291 | A1 | 11/2014 | Schwarz et al. |
| 2016/0006933 | A1 | 1/2016 | Zimmerman et al. |
| 2016/0012855 | A1 | 1/2016 | Krishnan |
| 2016/0112489 | A1* | 4/2016 | Adams .................. H04L 65/605 375/240.01 |
| 2016/0142697 | A1 | 5/2016 | Budagavi et al. |
| 2016/0205341 | A1 | 7/2016 | Hollander et al. |
| 2016/0260196 | A1 | 9/2016 | Roimela et al. |
| 2017/0013283 | A1 | 1/2017 | Zhang et al. |
| 2017/0142480 | A1 | 5/2017 | Gupta et al. |
| 2017/0147830 | A1 | 5/2017 | Park et al. |
| 2017/0244775 | A1 | 8/2017 | Ha et al. |
| 2017/0244951 | A1 | 8/2017 | Ha et al. |
| 2018/0152690 | A1 | 5/2018 | Ha et al. |
| 2019/0253693 | A1 | 8/2019 | Ha et al. |
| 2020/0092532 | A1 | 3/2020 | Ha et al. |

FOREIGN PATENT DOCUMENTS

| | | |
|---|---|---|
| CN | 101828390 | 9/2010 |
| CN | 104365095 | 2/2015 |
| EP | 1162830 | 12/2001 |
| EP | 1162830 | 8/2003 |
| EP | 2204992 | 7/2010 |
| EP | 2645713 | 10/2013 |
| JP | H10191355 | 7/1998 |
| JP | 2003101989 | 4/2003 |
| JP | 2005341093 A | 12/2005 |
| JP | 6663043 | 2/2020 |
| WO | WO-0060869 A1 | 10/2000 |
| WO | 2013068548 | 5/2013 |
| WO | 2016010668 | 1/2016 |

OTHER PUBLICATIONS

"European Application Serial No. 17753515.0, Extended European Search Report dated Apr. 29, 2019", 27 pgs.

"Japanese Application Serial No. 2018-562485, Notification of Reasons for Rejection dated Sep. 24, 2019", W English Translation, 10 pgs.

"Panoramic video processing by the omnidirectional camera Ladybug 2", image laboratory, vol. 16, (Dec. 1, 2005), 12 pgs.

"Korean Application Serial No. 10-2018-7023908, Notice of Preliminary Rejection dated Jan. 6, 2020", W English Translation, 19 pgs.

"U.S. Appl. No. 16/391,486, Notice of Allowance dated Aug. 21, 2020", 5 pgs.

"European Application Serial No. 17753515.0, Communication pursuant to Article 94(3) dated Aug. 5, 2020", 12 pgs.

"European Application Serial No. 17753515.0, Response filed Nov. 15, 2019 to Extended European Search Report dated Apr. 29, 2019", 31 pgs.

"Korean Application Serial No. 10-2018-7023908, Response filed Mar. 5, 2020 to Notice of Preliminary Rejection dated Jan. 6, 2020", w Machine English translation, 62 pgs.

"Japanese Application Serial No. 2018-562485, Response filed Dec. 23, 2019 to Notification of Reasons for Rejection dated Sep. 24, 2019", w English machine translation, 10 pgs.

"Chinese Application Serial No. 201780013448.9, Response filed Jul. 27, 2020 to Office Action dated Apr. 2, 2020", w English claims, 23 pgs.

"Korean Application Serial No. 10-2019-7013504, Office Action dated Mar. 19, 2020", w Machine English Translation, 14 pgs.

"Korean Application Serial No. 10-2019-7013504, Response filed May 12, 2020 to Office Action dated Mar. 19, 2020", w Machine English Translation, 60 pgs.

"Korean Application Serial No. 10-2019-7013504, Voluntary Amendment filed Sep. 10, 2020", w Machine Translation, 4 pgs.

"U.S. Appl. No. 16/689,520, Non Final Office Action dated Sep. 21, 2020", 11 pgs.

"U.S. Appl. No. 15/094,336, Final Office Action dated Mar. 28, 2017", 18 pgs.

"U.S. Appl. No. 15/094,336, Final Office Action dated Aug. 10, 2018", 15 pgs.

"U.S. Appl. No. 15/094,336, Non Final Office Action dated Aug. 12, 2016", 14 pgs.

"U.S. Appl. No. 15/094,336, Non Final Office Action dated Dec. 18, 2017", 23 pgs.

"U.S. Appl. No. 15/094,336, Notice of Allowance dated Feb. 14, 2019", 5 pgs.

"U.S. Appl. No. 15/094,336, Response filed Jun. 28, 2017 to Final Office Action dated Mar. 28, 2017", 15 pgs.

"U.S. Appl. No. 15/094,336, Response filed Nov. 11, 2016 to Non Final Office Action dated Aug. 12, 2016", 11 pgs.

"U.S. Appl. No. 15/094,336, Response filed Nov. 7, 2018 to Final Office Action dated Aug. 10, 2018", 15 pgs.

(56) References Cited

OTHER PUBLICATIONS

"U.S. Appl. No. 15/268,111, Examiner Interview Summary dated Mar. 30, 2017", 3 pgs.
"U.S. Appl. No. 15/268,111, Final Office Action dated Aug. 3, 2017", 11 pgs.
"U.S. Appl. No. 15/268,111, Non Final Office Action dated Feb. 17, 2017", 11 pgs.
"U.S. Appl. No. 15/268,111, Notice of Allowance dated Oct. 18, 2017", 9 pgs.
"U.S. Appl. No. 15/268,111, Response filed May 12, 2017 to Non Final Office Action dated Feb. 17, 2017", 17 pgs.
"U.S. Appl. No. 15/268,111, Response filed Oct. 3, 2017 to Final Office Action dated Aug. 3, 2017", 21 pgs.
"U.S. Appl. No. 15/268,111, Response filed Dec. 19, 2016 to Restriction Requirement dated Nov. 22, 2016", 2 pgs.
"U.S. Appl. No. 15/268,111, Restriction Requirement dated Nov. 22, 2016", 7 pgs.
"U.S. Appl. No. 15/877,799, Non Final Office Action dated Apr. 29, 2019", 9 pgs.
"U.S. Appl. No. 15/877,799, Notice of Non-Compliant Amendment dated Oct. 2, 2019", 5 pgs.
"U.S. Appl. No. 15/877,799, Response filed Jul. 29, 2019 to Non-Final Office Action dated Apr. 29, 2019", 13 pgs.
"U.S. Appl. No. 16/391,486, Notice of Allowance dated Mar. 11, 2020", 5 pgs.
"Cuda tool kit documentation", v7.5, [Online] Retrieved from the Internet : <http://docs.nvidia.com/cuda/#axzz40TIGVdNL>, (Sep. 1, 2015).
"Cuda Toolkit Documentation v7.5", Installation Guides, [Online] Retrieved on Feb. 18, 2016 from the Internet: <URL: http://docs.nvidia.com/cuda/>, (Sep. 2015).
"European Application Serial No. 17753515.0, Partial Supplementary European Search Report dated Jan. 3, 2019", 16 pgs.
"International Application Serial No. PCT/KR2017/001790, International Search Report dated May 23, 2017", 3 pgs.
"International Application Serial No. PCT/KR2017/001790, Written Opinion dated May 23, 2017", 10 pgs.
"NVIDIA video decoder (NVCUVID) interface", Programming Guide DA-05614-001_v8.0, (Nov. 2015), 1-8.
"Nvidia Video Encoder (NVENC) Interface", Programming Guide PG-06155-001_v06, (Oct. 2015), 5-22.
Bourke, et al., "Spherical Projections (Stereographic and Cylindrical)", in Transformations and Projections; Spherical Projections, (Dec. 1999), 1-40.
Jain, "Introduction to H.264 Video Standard", Presentation Transcript, [Online] Retrieved from the Internet: <URL: http:l/slideplayer.com/slide/3819249>, (2015).
Paul, Bourke, "Spherical Projections (Stereographic and Cylindrical)", Transformations and Projections, (Dec. 1999), 40 pgs.
Yu, et al., "Texture Mapping", California State University, San Bernardino: CSE 520 Advanced Computer Graphics, via internet, (2010).
"Korean Application Serial No. 10-2020-7027413, Notice of Preliminary Rejection dated Oct. 12, 2020", w English Translation, 8 pgs.
"U.S. Appl. No. 16/689,520, Response filed Oct. 29, 2020 to Non Final Office Action dated Sep. 21, 2020", 9 pgs.
"Chinese Application Serial No. 201780013448.9, Office Action dated Oct. 12, 2020", w English Translation, 9 pgs.
"U.S. Appl. No. 16/689,520, Notice of Allowance dated Nov. 12, 2020", 9 pgs.
"U.S. Appl. No. 16/391,486, Notice of Allowance dated Nov. 16, 2020", 5 pgs.
"U.S. Appl. No. 16/689,520, Corrected Notice of Allowability dated Dec. 17, 2020", 2 pgs.
"U.S. Appl. No. 16/391,486, Corrected Notice of Allowability dated Dec. 31, 2020", 2 pgs.
"Korean Application Serial No. 10-2020-7025921, Notice of Preliminary Rejection dated Feb. 5, 2021", w English Translation, 8 pgs.
"Indian Application Serial No. 201827035270, Office Action dated Mar. 17, 2021", w/ English translation, 70 pgs.

\* cited by examiner

SYSTEMS AND METHOD FOR GPU BASED VIRTUAL REALITY VIDEO STREAMING SERVER

CROSS-REFERENCE TO RELATED APPLICATION

The application is a continuation of U.S. application Ser. No. 16/391,486, filed Apr. 23, 2019, which is a continuation of U.S. application Ser. No. 15/094,336, filed Apr. 8, 2016, which claims the benefit of and priority to U.S. Provisional Application No. 62/297,394, entitled "System and Method for GPU Based Virtual Reality VIDEO Streaming Server," filed Feb. 19, 2016, all of which are hereby incorporated by reference herein in its their entirety.

TECHNICAL FIELD

The present disclosure relates to systems and methods for virtual reality video streaming and more particularly to systems and methods for processing and streaming a virtual reality video using a graphics processing unit (GPU).

BACKGROUND

Virtual Reality (VR) video contents usually have significantly high resolution in order to provide 360 degree view video data. For example, the 360 degree video data may include Ultra High Definition (UHD) video data having 4K (3840×1920) or higher resolution with 30~60 frames per second (FPS).

A graphics processing unit (GPU) is a specialized electronic circuit designed to rapidly manipulate and alter memory to accelerate the creation of images in a frame buffer intended for output to a display. Compared to central processing units (CPUs), GPUs can provide high speed real-time image processing with a low power consumption (e.g., 25% of a CPU) and low cost (e.g., in 2016, $160 for a GPU with 768 cores). A GPU can also provide parallel computing power by utilizing its multiple cores.

SUMMARY

In one aspect, a system for virtual reality (VR) video streaming is presented including a first processor, a first memory, a graphics processing unit (GPU), a second memory including a plurality of frame buffers, and a video server implemented by at least one of the first processor or the GPU. The video server may be configured to cause the first processor to read, from a video data source, source video data including multiple spherical image frame data and store the source video data in the first memory. The video server may be further configured to cause the GPU to convert, in response to storing first spherical image frame data in a first frame buffer of the second memory, the first spherical image frame data to first equirectangular image frame data that correspond to a portion of spherical image represented by the first spherical image frame data, encode the converted first equirectangular image frame data, and store the encoded first equirectangular image frame data in an encoded frame buffer of the second memory. The system may include a streaming server implemented by at least one of the first processor or the GPU. The streaming server may be configured to cause the first processor to establish a first connection to a client device, read, from the encoded frame buffer of the second memory, the encoded first equirectangular image frame data, and stream the encoded first equirectangular image frame data to the client device via the first connection. The video server and the streaming server may be configured to be executed as separate processes. The system may further include a communication server implemented by at least one of the first processor or the GPU. The communication server may be configured to cause the first processor to establish a second connection to the client device, transmit, to the client device, first information relating to a first field of view (FOV) corresponding to the first equirectangular image frame data, and receive, from the client device, second information relating to a second FOV. The video server may be further configured to cause the GPU to convert second spherical image frame data to second equirectangular image frame data that correspond to the second FOV of spherical image represented by the second spherical image frame data. The communication server and the streaming server may be configured to be executed as a single process. The first and second information relating to the first and second FOVs may include view angle data indicating azimuth angles and pitch angles.

In another aspect, a method of processing streaming a virtual reality (VR) video is presented that includes storing by a graphics processing unit (GPU) of a video server, in a first frame buffer memory, first spherical image frame data representing a first spherical image frame of the video. The method may further include receiving by a first processor of the video server, from a client device, first information relating to a first field of view (FOV). The method may further include converting, by the GPU of the video server, the first spherical image frame data stored in the first frame buffer memory to first equirectangular image frame data that correspond to the first FOV of the first spherical image frame represented by the first spherical image frame data. The method may further include encoding, by the GPU of the video server, the converted first equirectangular image frame data to generate first encoded image frame data. The GPU of the video server may parse and decode the video to generate the first spherical image frame data. The first information relating to the first FOV includes view angle data indicating azimuth angles and pitch angles. In converting the first spherical image frame data to the first equirectangular image frame data, it may be determined that the first information is received before the GPU has started converting the first spherical image frame data to the first equirectangular image frame data. The first processor may receive, from a client device, second information relating to a second FOV. The GPU of the video server may store, in the first frame buffer memory, second spherical image frame data representing a second spherical image frame of the video subsequent to the first spherical image frame. In response to determination that the second information is received after the GPU has started converting the first spherical image frame data to the first equirectangular image frame data and before the GPU of the video server has stored the second spherical image frame data in the first frame buffer memory, the GPU of the video server may convert the first spherical image frame data stored in the first frame buffer memory to second equirectangular image frame data that correspond to the second FOV of the first spherical image frame represented by the first spherical image frame data, encode the converted second equirectangular image frame data to second encoded image frame data, and omit conversion and encoding of the second spherical image frame data stored in the first frame buffer memory.

In one aspect, computer-readable media stores instructions that, when executed by a graphics processing unit (GPU) of a video server, cause the GPU to store, in a first frame buffer memory, first spherical image frame data representing a first spherical image frame of the video. The first processor of the video server may be caused to receive, from a client device, first information relating to a first field of view (FOV). The GPU of the video server may be caused to convert the first spherical image frame data stored in the first frame buffer memory to first equirectangular image frame data that correspond to the first FOV of the first spherical image frame represented by the first spherical image frame data. The GPU of the video server may be caused to encode the converted first equirectangular image frame data to generate first encoded image frame data. The GPU of the video server may be caused to parse and decode the video to generate the first spherical image frame data. The first information relating to the first FOV includes view angle data indicating azimuth angles and pitch angles. In converting the first spherical image frame data to the first equirectangular image frame data, it may be determined that the first information is received before the GPU has started converting the first spherical image frame data to the first equirectangular image frame data. The first processor may be caused to receive, from a client device, second information relating to a second FOV. The GPU of the video server may be caused to store, in the first frame buffer memory, second spherical image frame data representing a second spherical image frame of the video subsequent to the first spherical image frame. In response to determination that the second information is received after the GPU has started converting the first spherical image frame data to the first equirectangular image frame data and before the GPU of the video server has stored the second spherical image frame data in the first frame buffer memory, the GPU of the video server may be caused to convert the first spherical image frame data stored in the first frame buffer memory to second equirectangular image frame data that correspond to the second FOV of the first spherical image frame represented by the first spherical image frame data, encode the converted second equirectangular image frame data to second encoded image frame data, and omit conversion and encoding of the second spherical image frame data stored in the first frame buffer memory.

In another aspect, a method of displaying a video includes receiving by a first processor of a client device, from a video streaming server, first image frame data representing a first image frame of the video. The method may further include rendering by a graphics processing unit (GPU) of the client device, on a display of the client device having at least the same size as the first image frame, a first portion of the first image frame in a first display portion of the display, the remaining portion of the first image frame being hidden in a second display portion of the display. The method may further include, in response to receiving by the first processor of the client device, a user input indicating a first field of view (FOV), rendering by the GPU of the client device a second portion of the first image frame that has been previously hidden in the second display portion and located within the first FOV. The user input relating to the first FOV includes view angle data indicating azimuth angles and pitch angles. In rendering the second portion of the first image frame, the GPU of the client device may relocate a rendering area of the display from the first display portion to a third display portion having the same shape as the first display portion and including the second portion of the first image frame. The first processor of the client device may transmit, to the video streaming server, information indicating the first FOV. The first processor of the client device may receive, from the video streaming server, second image frame data representing a second image frame of the video and corresponding to the first FOV. The GPU may render, on the display of the client device, a portion of the second image frame in the first display portion of the display, the remaining portion of the first image frame being hidden in the second display portion of the display. The display may have a rectangular shape. The first display portion may have a rectangular shape located at a center of the rectangular display. The second display portion of the display may include at least one of left-side margin, right-side margin, top-side margin and bottom-side margin of the rectangular display. The first processor of the client device may transmit, to the video streaming server, information indicating the first FOV. The first processor of the client device may receive, from the video streaming server, second image frame data representing a second image frame of the video and corresponding to the first FOV. The GPU of the client device may relocate the rendering area of the display from the third display portion to the first display portion.

In one aspect, computer-readable media stores instructions that, when executed by a graphics processing unit (GPU) of a client device, cause the GPU to store, in a first frame buffer memory, first spherical image frame data representing a first spherical image frame of the video. The first processor of the video server may be caused to receive, from a client device, first information relating to a first field of view (FOV).

In another aspect, computer-readable media stores instructions that, when executed by a first processor of a client device, cause the first processor to receive, from a video streaming server, first image frame data representing a first image frame of the video. The computer-readable media stores instructions, when executed by a graphics processing unit (GPU) of the client device, may cause the GPU to render, on a display of the client device having at least the same size as the first image frame, a first portion of the first image frame in a first display portion of the display, the remaining portion of the first image frame being hidden in a second display portion of the display. In response to receiving by the first processor of the client device, a user input indicating a first field of view (FOV), the GPU of the client device may be caused to render a second portion of the first image frame that has been previously hidden in the second display portion and located within the first FOV. The user input relating to the first FOV may include view angle data indicating azimuth angles and pitch angles. In rendering the second portion of the first image frame, the GPU of the client device may be caused to relocate a rendering area of the display from the first display portion to a third display portion having the same shape as the first display portion and including the second portion of the first image frame. The first processor of the client device may be caused to transmit, to the video streaming server, information indicating the first FOV. The first processor of the client device may be caused to receive, from the video streaming server, second image frame data representing a second image frame of the video and corresponding to the first FOV. The GPU may be caused to render, on the display of the client device, a portion of the second image frame in the first display portion of the display, the remaining portion of the first image frame being hidden in the second display portion of the display. The display may have a rectangular shape. The first display portion may have a rectangular shape located at a center of the rectangular display. The second display portion of the display may include at least one of left-side margin, right-side margin, top-side margin and bottom-side margin of the rectangular display. The first processor of the client device may be caused to transmit, to the video streaming server, information indicating the first FOV. The first processor of the client device may be caused to receive, from the video streaming server, second image frame data representing a second image frame of the video and corresponding to the first FOV. The GPU of the client device may be caused to relocate the rendering area of the display from the third display portion to the first display portion.

BRIEF DESCRIPTION OF THE DRAWINGS

The above and related objects, features, and advantages of the present disclosure will be more fully understood by reference to the following detailed description, when taken in conjunction with the following figures, wherein.

DETAILED DESCRIPTION

Figure 1:
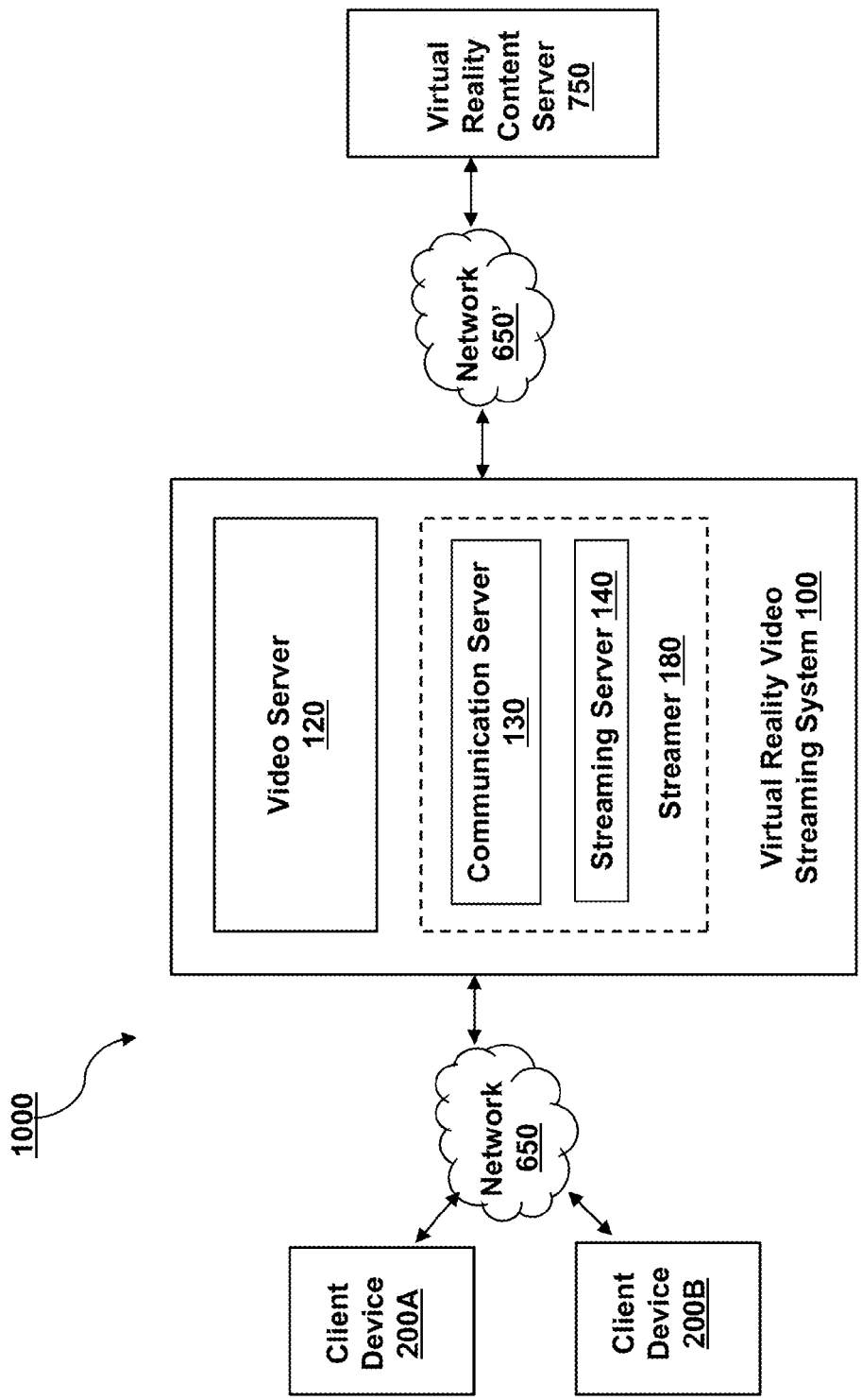
FIG. 1 is a block diagram of a network environment with client devices and a VR video streaming system according to some implementations.

Presented are systems and methods related to systems and methods for virtual reality (VR) video streaming and more particularly to systems and methods for processing and streaming a virtual reality video using a graphics processing unit (GPU). In some implementations, a GPU of a video server of a VR video streaming system may convert spherical image frame data to equirectangular image frame data that correspond to a portion of the first spherical image frame data, thereby effectively utilizing computing power of the GPU (e.g., parallel computing power via multiple cores) in processing high resolution VR video data.

In some implementations, a processor of the video server may receive, from a client device, information relating to a first field of view (FOV), and the GPU of the video server may convert the first spherical image frame data to first equirectangular image frame data that correspond to the first FOV of the first spherical image frame represented by the first spherical image frame data. With this configuration, per user input from a client device, the VR video streaming system can provide to the client device only a portion of video data which the user currently would like to view, e.g., a video portion relating to a current FOV of the user. There are many benefits by transmitting the video portion relating to the current FOV. First, it can save huge network bandwidth requirement (e.g., 4K UHD requires 16~20 Mbps, while transmission of FOV video data only may need only 1~2 Mbps). Second, transmission of FOV video data only can improve both the user experience as well as streaming service cost. It can provide low data rate transmission, thereby eliminating data buffering and reducing battery consumption of a client device. It can also reduce cost of streaming service, because streaming service providers may need to pay per their network service usage. Third, transmission of FOV video data only also can prevent contents piracy. For example, 4K UHD video contents are likely exposed to illegal copying. Partial streamed video data, received via transmission of FOV video data only, can only contain a portion of dynamically changed viewed angles, thereby preventing its contents from being illegally copied.

In some implementation, a GPU of a client device render a first portion of an image frame received from a video streaming server in a first display portion of a display (e.g., at the center of the display), while hiding the remaining portion of the image frame in a second display portion of the display (e.g., at the four-side margins of a rectangular display). In response to receiving a user input indicating a particular field of view (FOV) (e.g., a view angle toward a top left corner of the display), the GPU may render a second portion of the first image frame that has been previously hidden in the second display portion and located within the first FOV (e.g., a previously hidden portion near the top left corner of the display). With this configuration, for example, when the user of the client device changes his or her view angle toward a top left corner of the display while watching an image frame, the client device can immediately show a portion of the image frame previously hidden in the top left margin of the display. Therefore, the client device can immediately provide the user with a video portion of changed view angle without a delay which would occur if providing a new video portion of changed view angle after receiving the new video portion from the video streaming server.

FIG. 1 is a block diagram of an example network environment 1000 with a virtual reality (VR) video streaming system 100 and client devices 200A and 200B, and a virtual reality (VR) content server 750. In broad overview, the illustrated network environment includes a network 650 of interconnected network nodes (e.g., client devices and VR video systems) and a network 650' of interconnected network nodes (e.g., VR video systems and VR content servers). In some implementations, the network 650 is the same network as the network 650'. Referring to FIG. 1 in more detail, the network 650 or 650' is a network facilitating interactions between participant devices. An illustrative example network 650 or 650' is the Internet; however, in other implementations, the network 650 may be another network, such as a local network within a data center, a network fabric, or any other local area or wide area network. The network 650 or 650' may be composed of multiple connected sub-networks or autonomous networks. The network 650 or 650' can be a local-area network (LAN), such as a company intranet, a metropolitan area network (MAN), a wide area network (WAN), an inter-network such as the Internet, or a peer-to-peer network, e.g., an ad hoc WiFi peer-to-peer network. Any type and/or form of data network and/or communication network can be used for the network 650 or 650'. It can be public, private, or a combination of public and private networks. In general, the network 650 or 650' is used to convey information between computing devices, e.g., client devices 200A and 200B, the VR video streaming system 100, and the VR content server 750.

Figure 2:
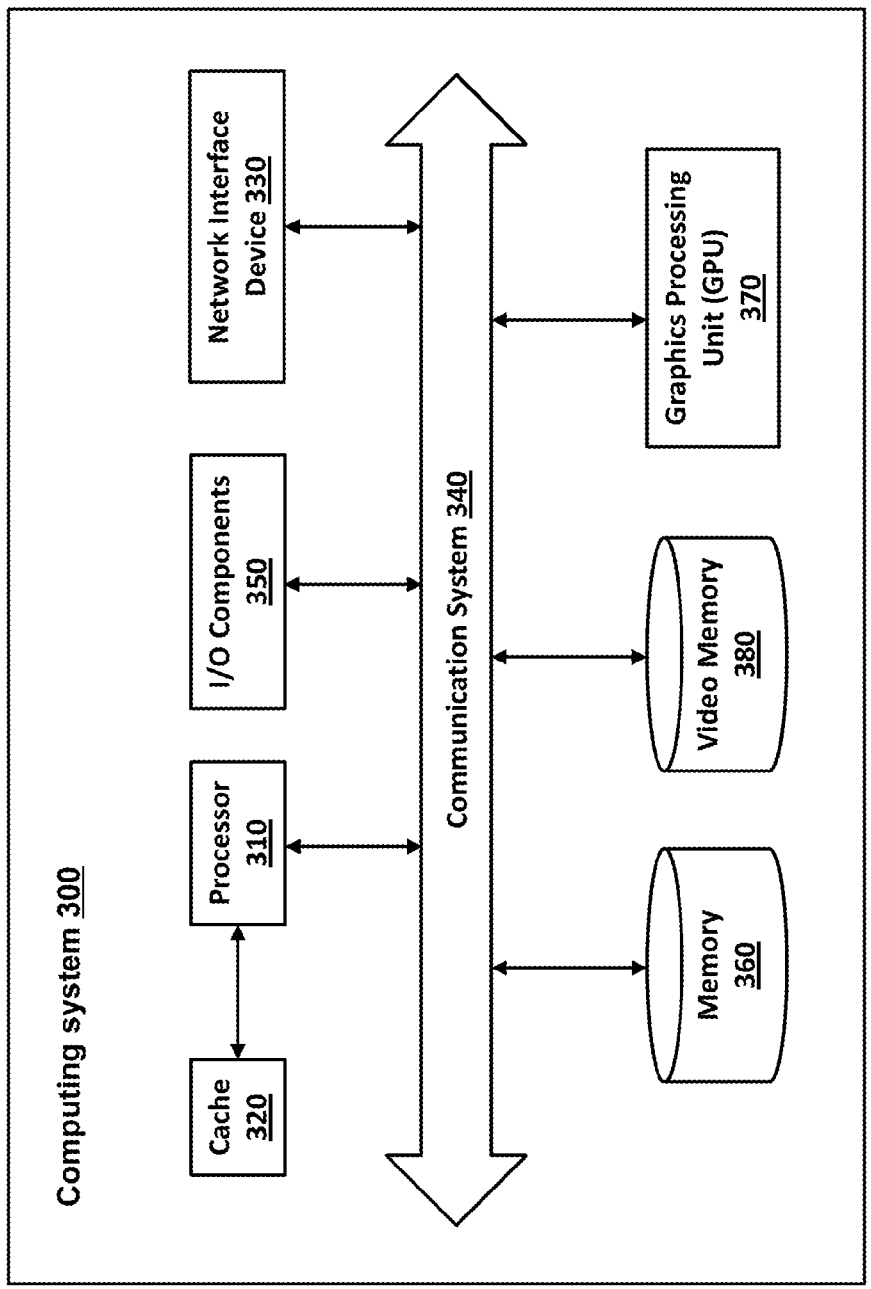
FIG. 2 is a block diagram of an example computing system.

Referring to FIG. 1, the VR video streaming system 100 includes a video server 120 and a streamer 180. In some implementations, the video server 120 stores VR video data locally (e.g., as video files) or receive streaming video data from the VR content server 750. In some implementations, the streamer 180 includes a communication server 130 and a streaming server 140. In some implementations, the communication server 130 communicates information relating to services of the streaming systems 100 (e.g., user login, VR video contents selection, low-latency video streaming, etc.) with each of the client devices 200A and 200B. In some implementations, the streaming server 140 streams VR video frame data to each client device. In some implementations, the VR video streaming system 100 has configuration similar to that of a computing system 300 as shown in FIG. 2. The computing system 300 is described in more detail below, in reference to FIG. 2. The elements shown in the computing system 300 illustrated in FIG. 2 do not all need to be present in some implementations of the VR video streaming system 100 illustrated in FIG. 1.

Referring again to FIG. 1, each of the client devices 200A and 200B can receive video streaming data from the VR video streaming system 100, e.g., more particularly, from the streaming server 140 of the streamer 180. In some implementations, each client device is a virtual reality client device having a display (e.g., head mounted displays (HMDs), optical HMDs), input devices (e.g., cameras, headsets), and sensors (e.g., motion sensor devices, position/orientation sensors, motion simulators, gesture tracking systems, etc.). In some implementations, each of the client devices 200A and 200B can also communicate with the communication server 130 to exchange information relating to services of the VR video streaming system 100. For example, each client device can provide the communication server 130 with the current field of view (FOV) of a user in the form of view angle data indicating azimuth angles and pitch angles. In some implementations, the client devices 200A and 200B have configuration similar to that of a computing system 300 as shown in FIG. 2. The computing system 300 is described in more detail below, in reference to FIG. 2. The elements shown in the computing system 300 illustrated in FIG. 2 do not all need to be present in some implementations of the client devices 200A and 200B illustrated in FIG. 1.

FIG. 2 is a block diagram of an example computing system 300. The example computing system 300 is suitable for use in implementing the computerized components described herein, in accordance with an illustrative implementation. In broad overview, the computing system 300 includes at least one processor 310 for performing actions in accordance with instructions and one or more memory devices 360 or 320 for storing instructions and data. The computing system 300 also includes at least one graphics processing unit (GPU) 370 and a video memory 380, as will be described in the following sections.

Referring to FIG. 2, the illustrated example computing system 300 includes one or more processors 310 in communication, via a communication system 340 (e.g., bus), with memory 360, at least one network interface controller 330 with network interface port 335 for connection to a network (not shown), and other components, e.g., input/output ("I/O") components 350. Generally, the processor(s) 310 will execute instructions (or computer programs) received from memory. The processor(s) 310 illustrated incorporate, or are directly connected to, cache memory 320. In some instances, instructions are read from memory 360 into cache memory 320 and executed by the processor(s) 310 from cache memory 320.

In more detail, the processor(s) 310 may be any logic circuitry that processes instructions, e.g., instructions fetched from the memory 360 or cache 320. In many implementations, the processor(s) 310 are microprocessor units or special purpose processors. The computing device 300 may be based on any processor, or set of processors, capable of operating as described herein. The processor(s) 310 may be single core or multi-core processor(s). The processor(s) 310 may be multiple distinct processors.

The memory 360 may be any device suitable for storing computer readable data. The memory 360 may be a device with fixed storage or a device for reading removable storage media. Examples include all forms of non-volatile memory, media and memory devices, semiconductor memory devices (e.g., EPROM, EEPROM, SDRAM, and flash memory devices), magnetic disks, magneto optical disks, and optical discs (e.g., CD ROM, DVD-ROM, or Blu-Ray® discs). A computing system 300 may have any number of memory devices 360.

The cache memory 320 is generally a form of computer memory placed in close proximity to the processor(s) 310 for fast read times. In some implementations, the cache memory 320 is part of, or on the same chip as, the processor(s) 310. In some implementations, there are multiple levels of cache 320, e.g., L2 and L3 cache layers.

The network interface controller 330 manages data exchanges via the network interface 335 (sometimes referred to as network interface ports). The network interface controller 330 handles the physical and data link layers of the OSI model for network communication. In some implementations, some of the network interface controller's tasks are handled by one or more of the processor(s) 310. In some implementations, the network interface controller 330 is part of a processor 310. In some implementations, a computing system 300 has multiple network interfaces 335 controlled by a single controller 330. In some implementations, a computing system 300 has multiple network interface controllers 330. In some implementations, each network interface 335 is a connection point for a physical network link (e.g., a cat-5 Ethernet link). In some implementations, the network interface controller 330 supports wireless network connections and an interface port 335 is a wireless (e.g., radio) receiver/transmitter (e.g., for any of the IEEE 802.11 protocols, near field communication "NFC", Bluetooth, ANT, or any other wireless protocol). In some implementations, the network interface controller 330 implements one or more network protocols such as Ethernet. Generally, a computing device 300 exchanges data with other computing devices via physical or wireless links through a network interface 335. The network interface 335 may link directly to another device or to another device via an intermediary device, e.g., a network device such as a hub, a bridge, a switch, or a router, connecting the computing device 300 to a data network such as the Internet.

The computing system 300 may include, or provide interfaces for, one or more input or output ("I/O") devices. Input devices include, without limitation, keyboards, microphones, touch screens, foot pedals, sensors, MIDI devices, and pointing devices such as a mouse or trackball. Output devices include, without limitation, video displays, speakers, refreshable Braille terminal, lights, MIDI devices, and 2-D or 3-D printers.

Other components may include an I/O interface, external serial device ports, and any additional co-processors. For example, a computing system 300 may include an interface (e.g., a universal serial bus (USB) interface) for connecting input devices, output devices, or additional memory devices (e.g., portable flash drive or external media drive). In some implementations, a computing device 300 includes an additional device such as a co-processor, e.g., a math co-processor can assist the processor 310 with high precision or complex calculations.

The GPU 370 may be a graphics accelerator chip, processor, application specific integrated circuit, analog circuit, digital circuit, accelerator card, or combinations thereof. In one implementations, the GPU 370 may be a personal computer graphics accelerator card or components, such as manufactured by nVidia, ATI, or Matrox. The GPU 370 provides hardware devices for accelerating volume rendering processes, such as using application programming interfaces (APIs) for three-dimensional texture mapping. For example, such APIs include OpenGL and DirectX, but other APIs may be used independent of or with the GPU 370. Exemplary APIs for nVidia GPUs are described in a web document entitled "CUDA Toolkit Documentation v. 7.5," available at http://docs.nvidia.com/cuda/#axzz40TIGVdNL, which is incorporated herein by reference for details as to how to configure GPUs to accomplish the functions as set forth in this patent application. In some implementations, based on an API or an application controlling the API, the GPU 370 is operable for transformations, projections, and mapping for computer graphics (e.g., spherical projections and coordinate system translations).

The video memory 380 is a video random access memory (VRAM), a random access memory, a random access memory (RAM) drive or RAM disk, or other memory device for storing data or video information. In one implementations, the video memory 380 is a video random access memory of the GPU 370. A driver for the GPU 370 or a memory driver controls storage of data by the video memory 380. The video memory 380 is responsive to the driver to store, transfer, and retrieve data. The video memory 380 is operable to store subsets or bricks of data.

Figure 3A:
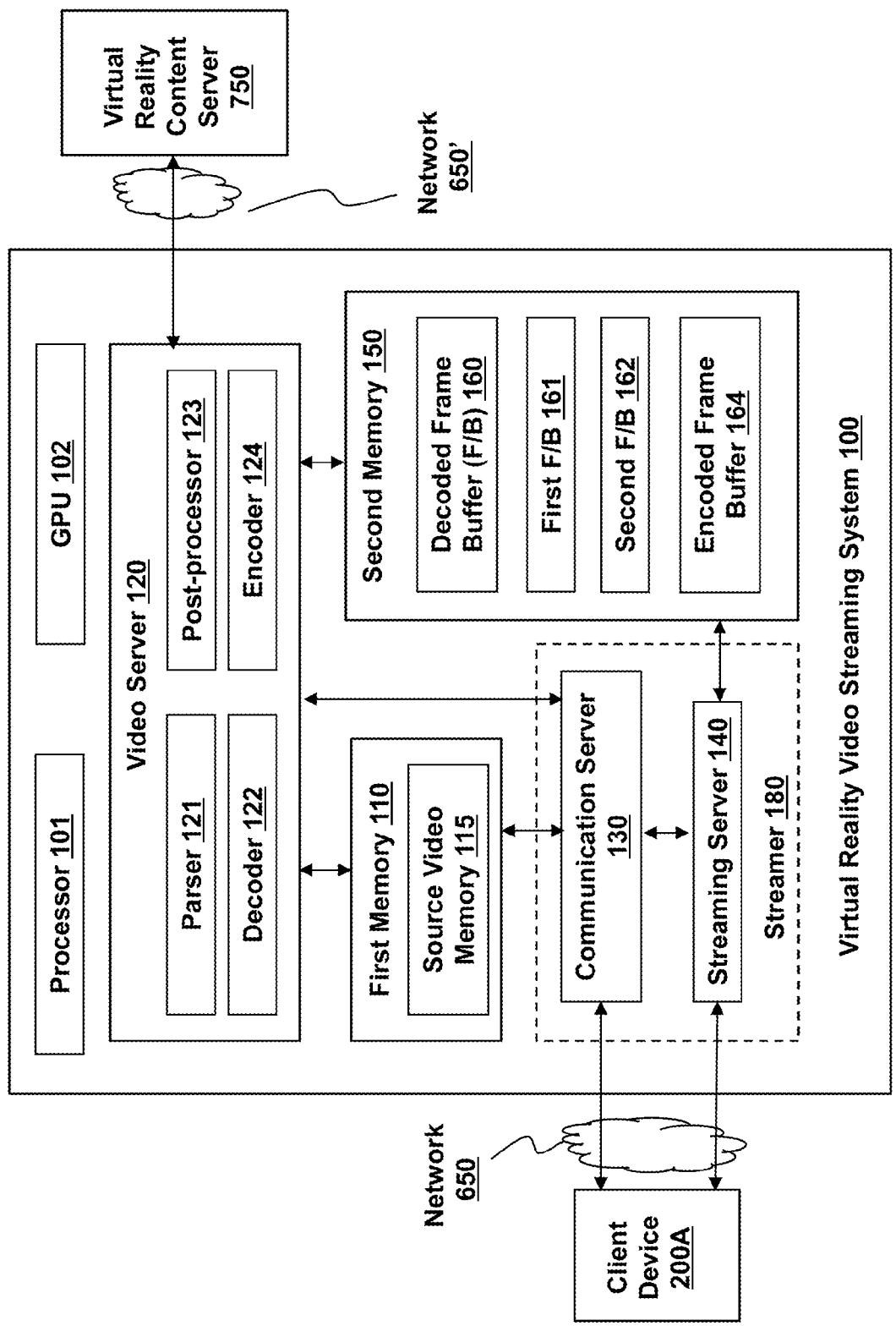
FIG. 3A is a block diagram of an example VR video streaming system.

FIG. 3A is a block diagram of an example VR video streaming system. Referring to FIG. 3A, in some implementations, the VR video streaming system 100 includes a first processor 101, a first memory 110, a GPU 102, a second memory 150 including a plurality of frame buffers (e.g., a decoded frame buffer 160, a first frame buffer 161, a second frame buffer 162, an encoded frame buffer 164). In some implementations, the first processor 101 has similar configuration to the processor 310 in FIG. 2. In some implementations, the GPU 102 has similar configuration to the GPU 370 in FIG. 2. In some implementations, the first memory 110 has similar configuration to the memory 360 in FIG. 2. In some implementations, the second memory 150 has similar configuration to the video memory 380 in FIG. 2. In some implementations, the system 100 includes source video memory 115, which can reside in the first memory 110 or the second memory 150.

Referring to FIG. 3A, in some implementations, the video server 120 can be executable by (or implemented by) either the first processor 101 or the GPU 102. For example, the video server 120 may be configured to read, via the first processor, source video data from a video data source (e.g., video files locally stored in the video server 120, or video data streamed from the VR content server 750). In some implementations, the source video data includes multiple spherical image frame data (e.g., 360 degree UHD 4K frame data). In some implementations, the video server 120 may store the source video data in the source video memory 115.

Figure 3B:
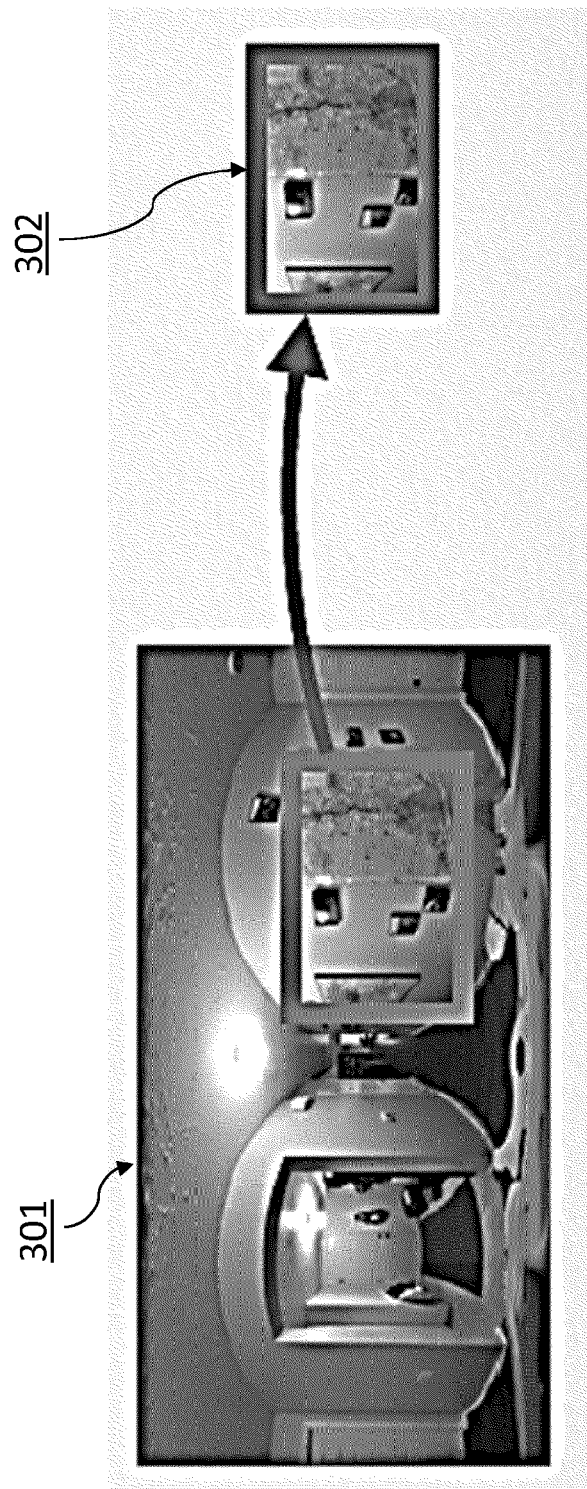
FIG. 3B shows example frame images.

In some implementations, the video server 120 may include a parser 121, a decoder 122, a post-processor 123, and an encoder 124, executable by (or implemented by) the GPU 102. In some implementations, the parser 121 parses, via GPU 102, the source video data stored in the source video memory 115 and identifies different spherical image frames from the source video data. In some implementations, the decoder 122 decodes, via GPU 102, the parsed spherical image frames and stores them in the decoded frame buffer 160. In some implementations, the decoder 122 and encoder 124 may use industry standard compression/decompression technology, such as H.264/HEVC (High Efficiency Video Coding). In some implementations, the decoder 122 decodes first spherical image frame data and store the decoded data in the decoded frame buffer 160. An exemplary decoder is described in a document entitled "NVIDIA VIDEO DECODER (NVCUVID) INTERFACE Programming Guide," November 2015, which is incorporated herein by reference for details as to how to configure a decoder to accomplish the decoding functions as set forth in this patent application. In some implementations, the post-processor 123 performs a color format conversion. For example, the post-processor 123 may convert frame data stored in the decoded frame buffer 160, from a luminance/chrominance format to an Alpha Red Green Blue (ARGB) color format. In some implementations, the post-processor 123 stores color format-converted frame data in the first frame buffer 161. In some implementations, the post-processor 123 performs, via GPU 102, a spherical-equirectangular conversion (e.g., using spherical/equirectangular projection or mapping methods). Exemplary spherical/equirectangular projections are described in a document entitled "Transformations and projections," written by Paul Bourke, which is incorporated herein by reference for details as to the projections, conversions, and mapping methods described in this patent application. In some implementations, in response to storing first spherical image frame data in the first frame buffer 161, the post-processor 123 converts, via GPU 102, the first spherical image frame data to first equirectangular image frame data. For example, the post-processor 123 converts, via GPU 102, 360 degree 4K UHD image frame data to corrected or undistorted equirectangular image frame data. In some implementations, the post-processor 123 converts, via GPU 102, the first spherical image frame data (e.g., 360 degree 4K UHD image frame data) to first equirectangular image frame data that correspond to a portion of spherical image represented by the first spherical image frame data (e.g., a portion of 360 degree 4K UHD image frame data that corresponds the current field of view (FOV) of the user in a client device). FIG. 3B shows an example spherical frame image 301 and a portion 302 of the spherical frame image 301 that corresponds to the current FOV.

In some implementation, the post-processor 123 also performs, via GPU 102, augmented reality (AR) processing. For example, the post-processor 123 may blend the converted first equirectangular image frame with graphics contents (e.g., blending a road image with a vehicle image) or textual/graphical information (e.g., blending a street image with shop information). In some implementation, in response to completing post-processing operations (e.g., spherical-equirectangular conversion), the post-processor 123 stores post-processed frame data in the second frame buffer 162. In some implementations, the encoder 124 encodes, via GPU 102, the post-processed frame data stored in the second frame buffer 162, and stores encoded frame data in the encoded frame buffer 164. An exemplary encoder is described in a document entitled "NVIDIA VIDEO ENCODER (NVENC) INTERFACE Programming Guide," October 2015, which is incorporated herein by reference for details as to how to configure an encoder to accomplish the encoding functions as set forth in this patent application. In some implementations, the parser 121, the decoder 122, the post-processor 123 and the encoder are executed by the GPU 102 of the system 100. In some implementations, some operations of the parser 121, the decoder 122, the post-processor 123 and the encoder are executed by the first processor 101 and others operations are executed by the GPU 102.

Referring to FIG. 3A, in some implementations, the system 100 includes the communication server 130 executable by (or implemented by) at least one of the first processor 101 or the GPU 102. In some implementations, the communication server 130 establishes, via the first processor 101, a connection to a client device, e.g., the client device 200A. In some implementation, the established connection uses a full-duplex channel protocol, e.g., using a websocket protocol, thereby reducing latency through a few frames (e.g., websocket frames) without communicating large amounts of protocol headers (e.g., http headers). In some implementations, the communication server 130 can transmit to the client device first information relating to a first field of view (FOV) corresponding to the first equirectangular image frame data converted by the post-processor 123. In some implementations, the communication server 130 can receive, from the client device, second information relating to a second FOV, e.g., the current FOV of the user of the client device. In some implementation, both in the client device 200A and streaming system 100, an initial FOV is by default set to an angle straight towards right at the center of the image frame the user currently watches. In some implementations, information relating to FOVs includes view angles indicating pitch angles and azimuth angles. In some implementations, upon request from a client device (e.g., via websocket protocol), the communication server can update, via the first processor 101, the current FOV of the user (of the client device) asynchronously during the GPU operations of the video server 120, e.g., during operations by the parser 121, the decoder 122, the post-processor 123 and the encoder 124. In some implementations, such asynchronously updated FOVs can be utilized for reduced latency encoding, as will be described below with reference to FIGS. 4-6. For example, the video server 120 can immediately convert, via GPU 102, spherical image frame data to equirectangular image frame data that correspond to an asynchronously updated FOV of spherical image represented by the spherical image frame data, thereby reducing encoding latency. In some implementations, client devices can update the communication server on the current view angle of a user of the client devices via a stable connection method (e.g., jetty based on websocket protocol) with the communication server, thereby providing a constant connection state and reducing security overhead and latency.

In some implementations, a client device can make request for particular VR image/video data to the communication server 130. For example, a client device can make a VR image request to the communication server via websocket protocol. In some implementations, upon this request from the client device, the communication server can fetch, via the first processor, corresponding source video data (e.g., from a local file or from streaming by the VR content server 750) and provide it to the GPU 102 so that the GPU 102 can perform operations of the above-described decoding/post-processing/encoding on the corresponding video data. In some implementations, the communication server can provide a web service for use of managing services of the VR video streaming system 100 (e.g., managing user login and credentials validation to the services, managing user accounts/profiles, and listing VR video contents so that users can choose video content to watch).

Referring to FIG. 3A, the system 100 may include the streaming server 140 executable by (or implemented by) at least one of the first processor 101 or the GPU 102. In some implementations, the streaming server 140 establishes, via the first processor 101, a first connection to a client device (e.g., the client device 200A). In some implementations, the streaming server 140 uses a real time streaming protocol (RTSP) to timely deliver video data to the user of the client device. In some implementations, the streaming server reads, from the encoded frame buffer 164, the encoded first equirectangular image frame data, and streams the encoded first equirectangular image frame data to the client device 200A via the first connection. In some implementations, the video server 120 and the streaming server 140 are executed as separate processes. In some implementations, the communication server and the streaming server may be configured to be executed as a single process. In some implementations, the communication server 130 directly interacts, via websocket protocol, with client devices and is executed on the same physical server as the video server 120, thereby reducing feedback and communication latency. In some implementations, the streaming server 140 and the communication server 130 (collectively called "streamer" 180) are executed in the same single process, while the video server 120 being executed as a separate process that can be started and managed by the streamer 180. This dual process configuration can improve network responsiveness (by reducing delay) and system stability. In some implementations, the streaming server 140 and the video server 120 can share the video stream data (as finally served to client devices) via a random access memory (RAM) drive or RAM disk. Such RAM drives or disks can be accessed as files while actual data resides in a system RAM, thereby removing hardware I/O overhead and latency.

Figure 4A:
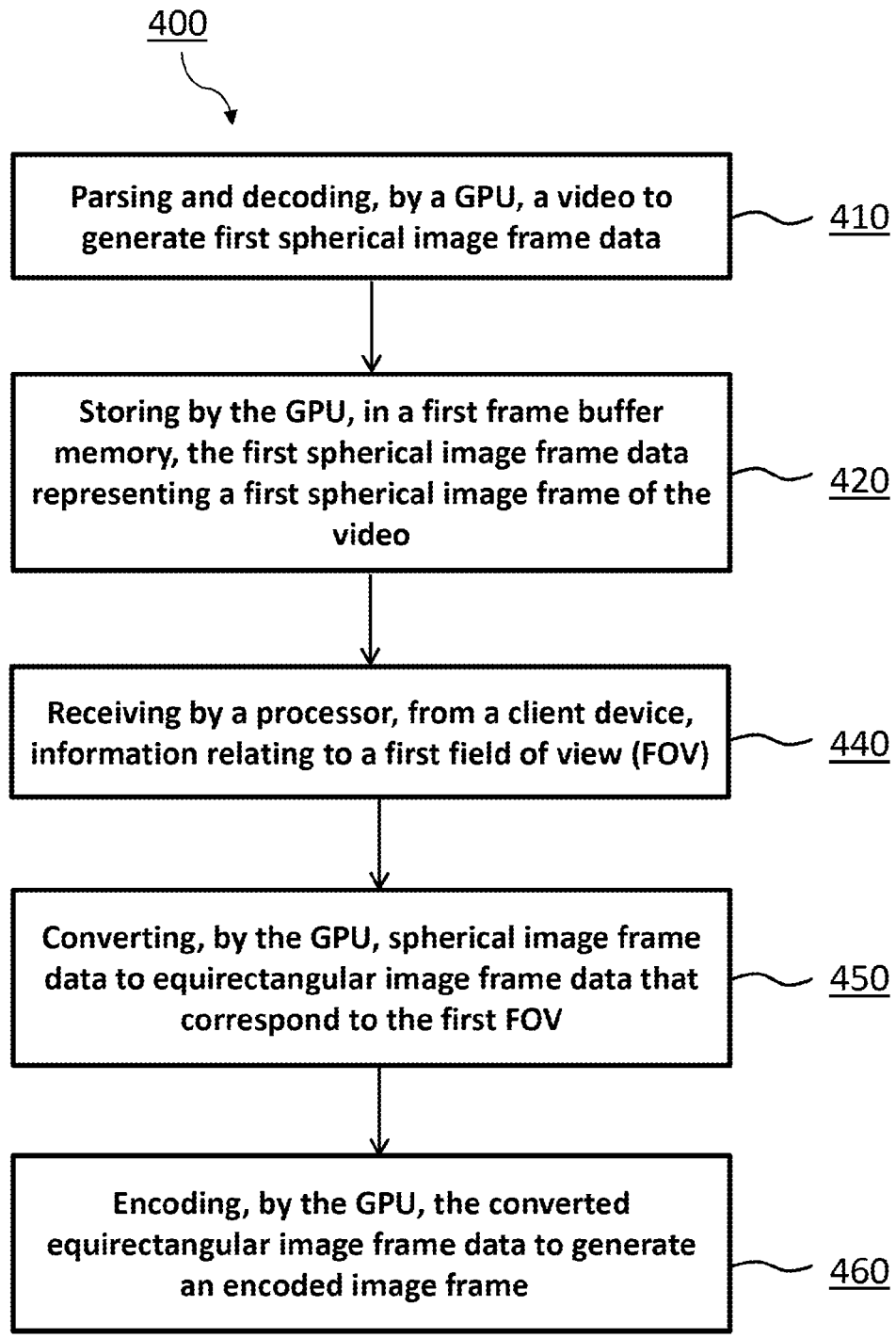
FIGS. 4A and 4B are flowcharts showing operations of a Field of View (FOV) based post processing method of a VR video streaming system, according to some implementations.

FIG. 4A is a flowchart showing operations of a Field of View (FOV) based post processing method 400 of a VR video streaming system, according to some implementations. In broad overview, the method 400 begins with stage 410, where a GPU of a video server (e.g., the GPU 102 in FIG. 3A) may parse and decode a source video to generate first spherical image frame data. At stage 420, the GPU 102 may store, in a first frame buffer memory (e.g., the first frame buffer 161), first spherical image frame data representing a first spherical image frame of the video. At stage 440, a first processor of the video server (e.g., the processor 101 in FIG. 3A) may receive, from a client device, first information relating to a first field of view (FOV). At stage 450, the GPU 102 of the video server may convert spherical image frame data stored in the first frame buffer memory to equirectangular image frame data that correspond to the first FOV of the first spherical image frame represented by the spherical image frame data stored in the first frame buffer memory. At stage 460, the GPU 102 of the video server may encode the converted equirectangular image frame data to generate encoded image frame data so that a streaming server (e.g., the streaming server 140 in FIG. 3A) can stream, to the client device, only the encoded equirectangular image frame data that correspond to the first FOV. The flowchart in FIG. 4A will be described below in more detail, referring to FIGS. 5A-5C.

Figure 5A:
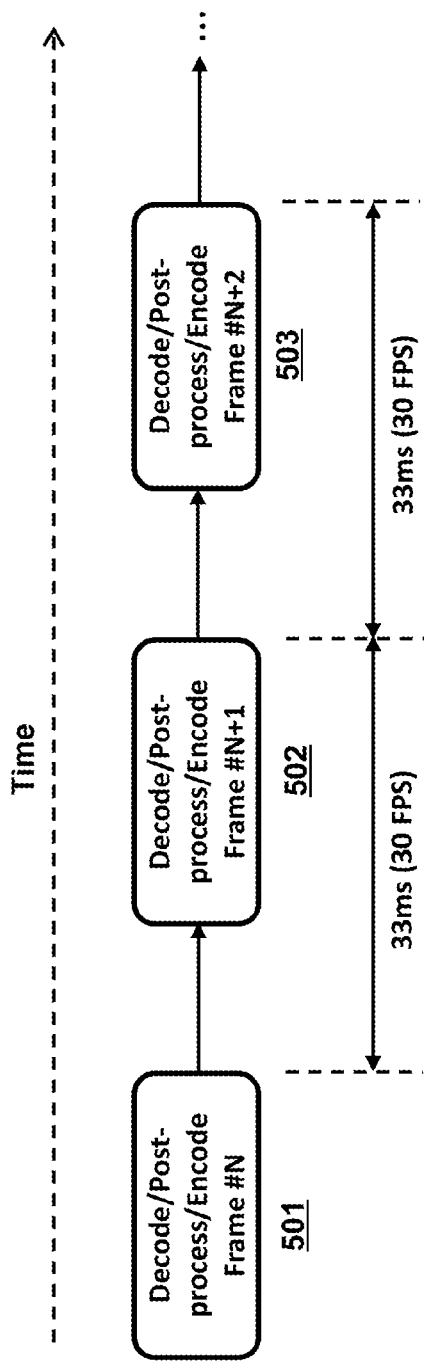
FIGS. 5A, 5B and 5C are block diagrams of an example FOV based post processing method in an example VR video streaming system.
Figure 5B:
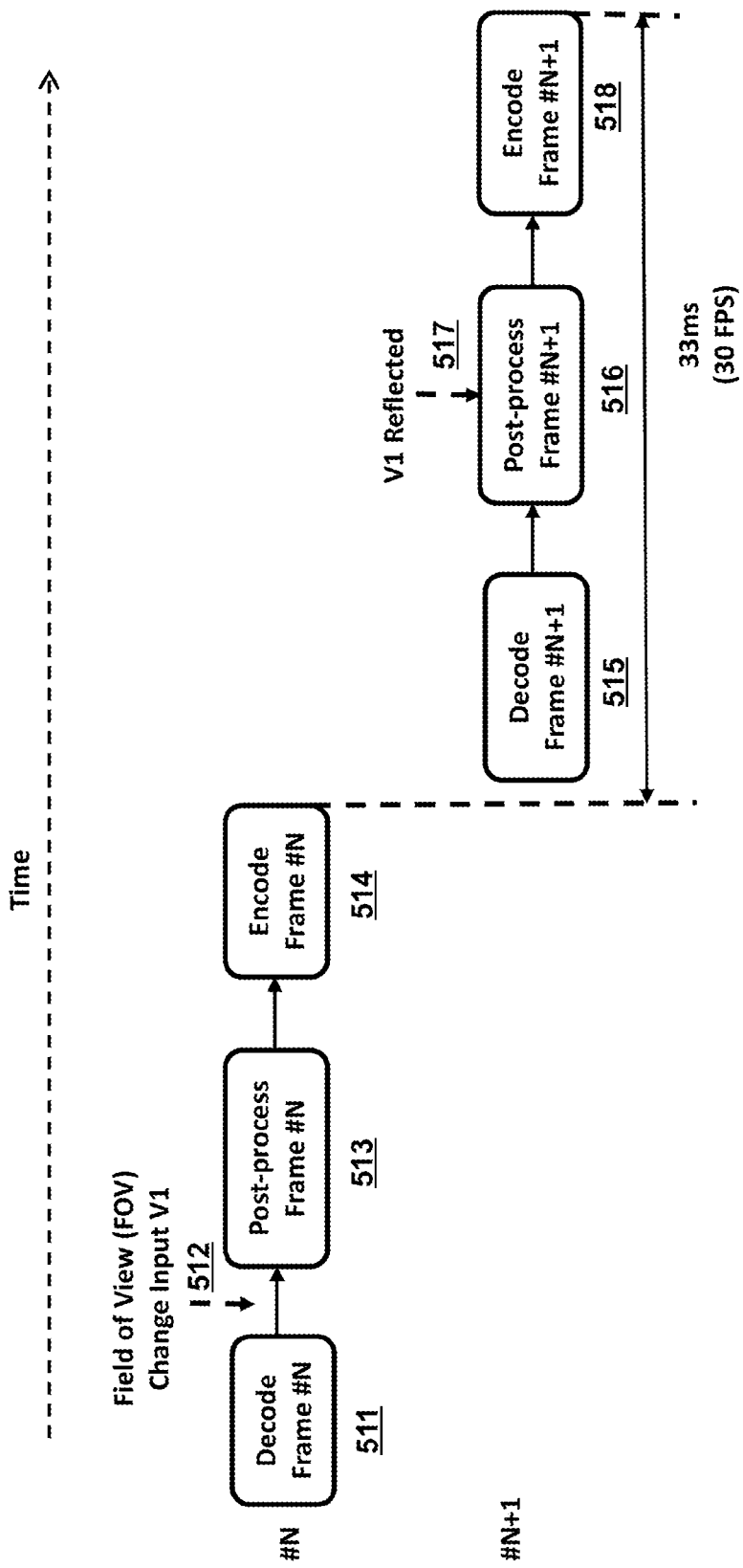
Figure 5C:
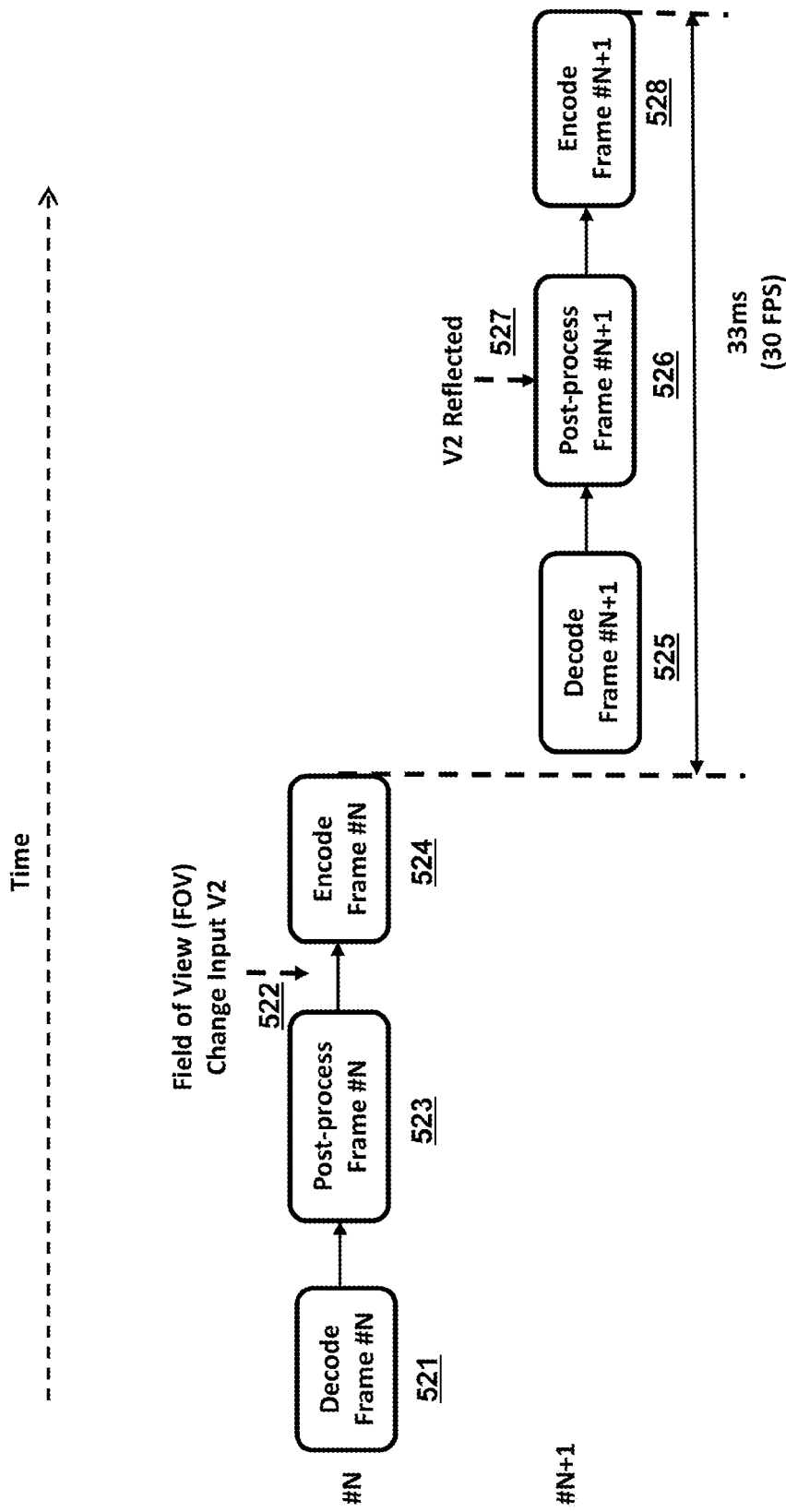

FIGS. 5A, 5B and 5C are block diagrams of an example FOV based post processing method in an example VR video streaming system. FIG. 5A shows an example timing of GPU processing of a sequence of video frames (e.g., frame #N, frame #N+1, and frame #N+2). A regular video file usually has 24, 25, 29, or 30 frames per second (FPS). For example, as shown in FIG. 5A, for a video file with 30 FPS, the time gap between encoding completion of each frame may be 33 ms, and the time stamp of frame #N from decoder may be N*33 ms, and that of frame #N+1 is (N+1)*33 ms, and so on. In other words, referring to FIG. 5A, the time gap between completion of decoding/post-processing/encoding of frame #N (501) and that of frame #N+1 (502) is 33 ms, and the time gap between completion of decoding/post-processing/encoding of frame #N+1 (502) and that of frame #N+2 (503) is 33 ms. Therefore, in this example, each frame is encoded every 33 ms in order to generate (and stream) 30 frames per one second.

FIG. 5B shows an example FOV based post processing method in a case where an FOV change input (e.g., azimuth angles and pitch angles) from a client device is received before post-processing frame #N. Referring to FIG. 5B, for example, a GPU decodes (511)/post-processes (513)/encodes (514) frame #N, and subsequently decodes (515)/post-process (516)/decodes (518) frame #N+1. In some implementations, if a processor (e.g., processor 101 in FIG. 3A) of the video streaming system 100 receives (512) a first FOV change input V1 (relating to a first FOV) from the client device before the post-processing of frame #N (513), the GPU can reflect (517) the first FOV change input V1 during the post-processing of frame #N+1 (516). In some implementations, the GPU can reflect (517) the first FOV change input V1 by converting the spherical image frame data associated with frame #N+1 to equirectangular image frame data that correspond to the first FOV of the spherical image frame represented by the frame #N+1 spherical image frame data. In this example, the time gap between encoding completion of frame #N and that of frame #N+1 can be maintained as 33 ms.

FIG. 5C shows another example FOV based post processing method in a case where an FOV change input (e.g., changed azimuth angles and pitch angles) from a client device is received during post-processing of frame #N. Referring to FIG. 5C, for example, a GPU decodes (521)/post-processes (523)/encodes (524) frame #N, and subsequently decodes (525)/post-process (526)/decodes (528) frame #N+1. In some implementations, if a processor of the video streaming system 100 receives (522) a second FOV change input V2 (relating to a second FOV) from the client device after the post-processing of frame #N (523), the GPU can reflect (527) the second FOV change input during the post-processing of frame #N+1 (526). In some implementations, the GPU can reflect (527) the second FOV change input V2 by converting the spherical image frame data associated with frame #N+1 to equirectangular image frame data that correspond to the second FOV of the spherical image frame represented by the frame #N+1 spherical image frame data. In this example, the time gap between encoding completion of frame #N and that of frame #N+1 can be maintained as 33 ms.

Now, the flowchart in FIG. 4A will be described in more detail, referring to FIGS. 5A-5C. At stage 410, a GPU (e.g., the GPU 102 in FIG. 3A) of a video server (e.g., the video server 120 in FIG. 3A) may parse and decode a source video to generate first spherical image frame data. For example, referring to FIG. 5B, the GPU parses and decodes (511) frame #N to generate spherical image frame data for frame #N.

At stage 420, the GPU of a video server may store, in a first frame buffer memory (e.g., the first frame buffer 161 in FIG. 3A), first spherical image frame data representing a first spherical image frame of the source video. In some implementations, the GPU then reads the first spherical image frame data from the first frame buffer 161 and post-processes the first spherical image frame data. For example, referring to FIG. 5B, the GPU reads the spherical image frame data for frame #N from the first frame buffer 161 and post-processes (513) the first spherical image frame data for frame #N. Similarly, referring to FIG. 5C, the GPU reads the spherical image frame data for frame #N from the first frame buffer 161 and post-processes (523) the first spherical image frame data for frame #N.

At stage 440, a first processor 101 of the video server may receive from a client device (e.g., the client device 200A in FIGS. 1 and 3A) first information relating to a first field of view (FOV). For example, referring to FIG. 5B, the first processor receives from the client device a first FOV change input V1 (512) before post-processing frame #N (513). Similarly, referring to FIG. 5C, the first processor 101 receives from the client device a second FOV change input V2 (522) during or after the post-processing of frame #N (523). In some implementations, the client device transmits to a VR video streaming system (e.g. the system 100 in FIGS. 1 and 3A), FOV change inputs that include view angle data indicating azimuth angles and pitch angles.

At stage 450, the GPU of the video server may convert the first spherical image frame data stored in the first frame buffer memory to equirectangular image frame data that correspond to the first FOV of the first spherical image frame represented by the first spherical image frame data stored in the first frame buffer memory. For example, referring to FIG. 5B, the GPU of the video server converts (during the post-processing 516) the spherical image frame data of frame #N+1 to equirectangular image frame data of frame #N+1 that correspond to the first FOV change input V1 as reflected in the spherical image frame of frame #N+1. Similarly, referring to FIG. 5C, the GPU of the video server converts (during the post-processing 526) the spherical image frame data of frame #N+1 to equirectangular image frame data of frame #N+1 that correspond to the second FOV change input V2 as reflected in the spherical image frame of frame #N+1. A modified operations of stage 450 for reduced delay encoding will be described in more detail below with reference to FIGS. 4B and 6A-6C.

At stage 460, the GPU of the video server may encode the converted equirectangular image frame data to generate encoded image frame data so that the streaming server can stream, to the client device, only the encoded equirectangular image frame data that correspond to the first FOV. For example, referring to FIG. 5B, the GPU of the video server encodes (518) the converted equirectangular image frame data for frame #N+1 to generate encoded image frame data of frame #N+1. Similarly, referring to FIG. 5C, the GPU of the video server encodes (528) the converted equirectangular image frame data for frame #N+1 to generate encoded image frame data of frame #N+1.

Figure 4B:
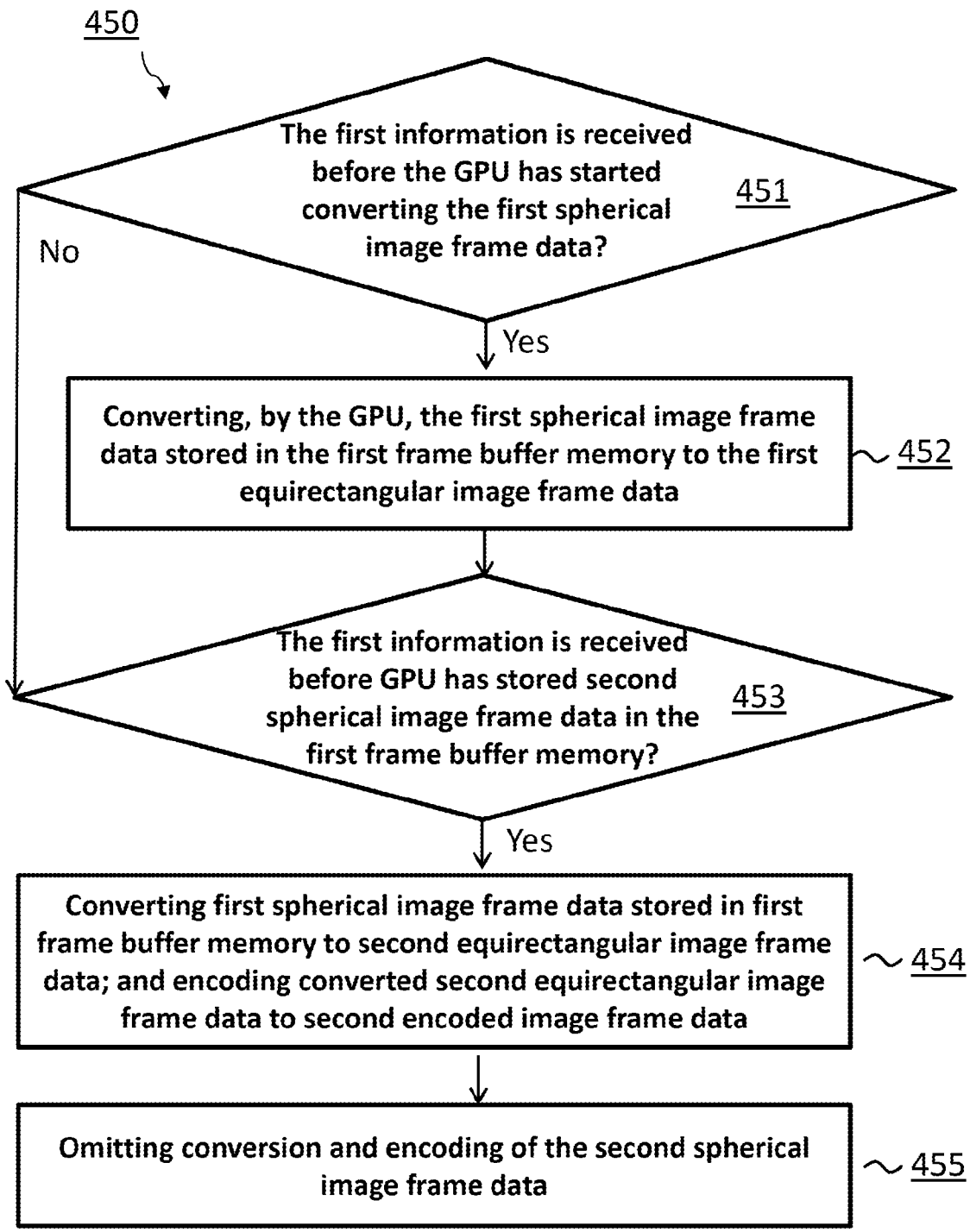

FIG. 4B is a flowchart showing operations of the Field of View (FOV) based post processing method (i.e., modified operations of stage 450 in FIG. 4B for reduced delay encoding) of a VR video streaming system, according to some implementations. In broad overview, the method 450 begins with stage 451, where the video server 120 may determine whether the first information relating to the first FOV is received from the client device before the GPU has started converting the first spherical image frame data to the first equirectangular image frame data. At stage 452, in response to determining that the first FOV information is received from the client device before the GPU has started converting the first spherical image frame data to the first equirectangular image frame data, the GPU may convert the first spherical image frame data to the first equirectangular image frame data that correspond to the first FOV of the first spherical image frame represented by the first spherical image frame data. At stage 453, in response to determining that the first information relating to the first FOV is received after the GPU has started converting the first spherical image frame data to the first equirectangular image frame data, the video server 120 may further determine whether the first FOV information information is received before the GPU has stored second spherical image frame data (e.g., the spherical image frame data subsequent to the first spherical image frame data) in the first frame buffer memory. At stage 454, in response to determination that the first FOV information is received before the GPU has stored the second spherical image frame data in the first frame buffer memory, the GPU may convert the first spherical image frame data stored in the first frame buffer memory to equirectangular image frame data that correspond to the first FOV of the first spherical image frame represented by the first spherical image frame data, and encode the converted equirectangular image frame data to generate encoded second equirectangular image frame data. At stage 455, the GPU may omit conversion and encoding of the second spherical image frame data stored in the first frame buffer memory. The flowchart in FIG. 4B will be described below in more detail, referring to FIGS. 6A-6C.

Figure 6A:
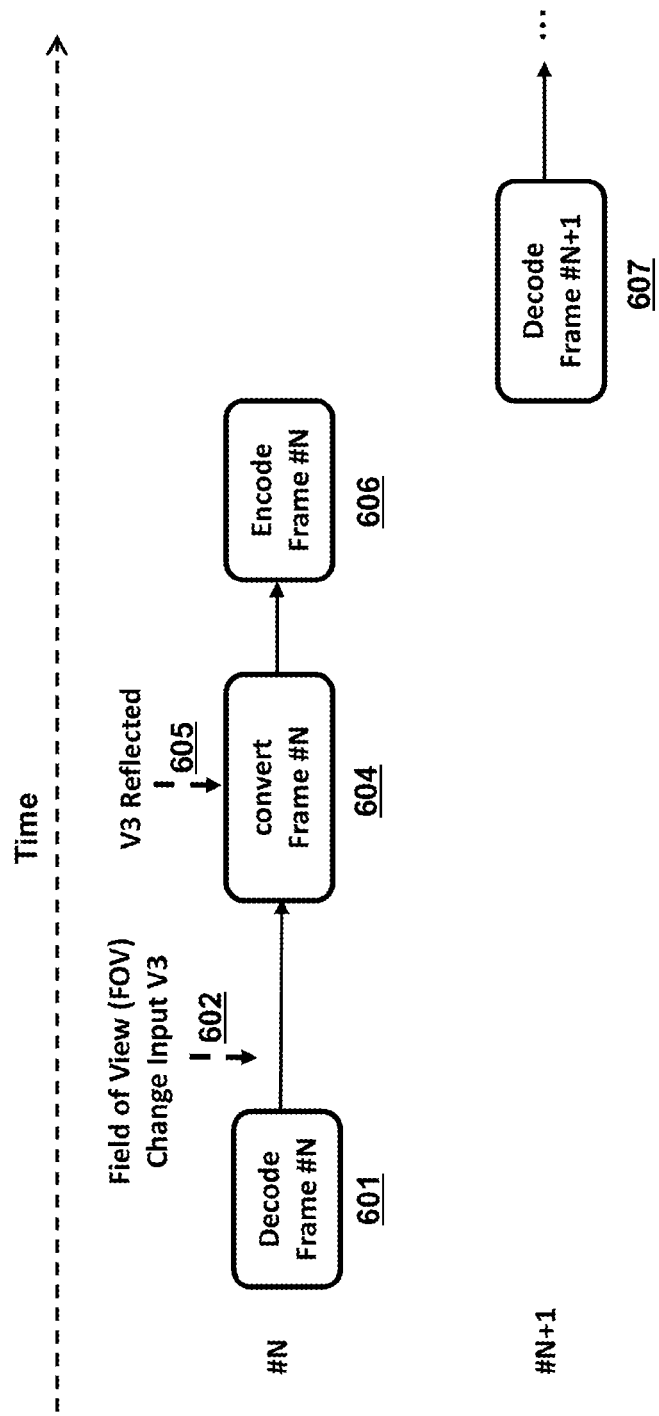
FIGS. 6A, 6B and 6C are block diagrams of an example FOV based post processing method for reduced latency encoding in an example VR video streaming system.
Figure 6B:
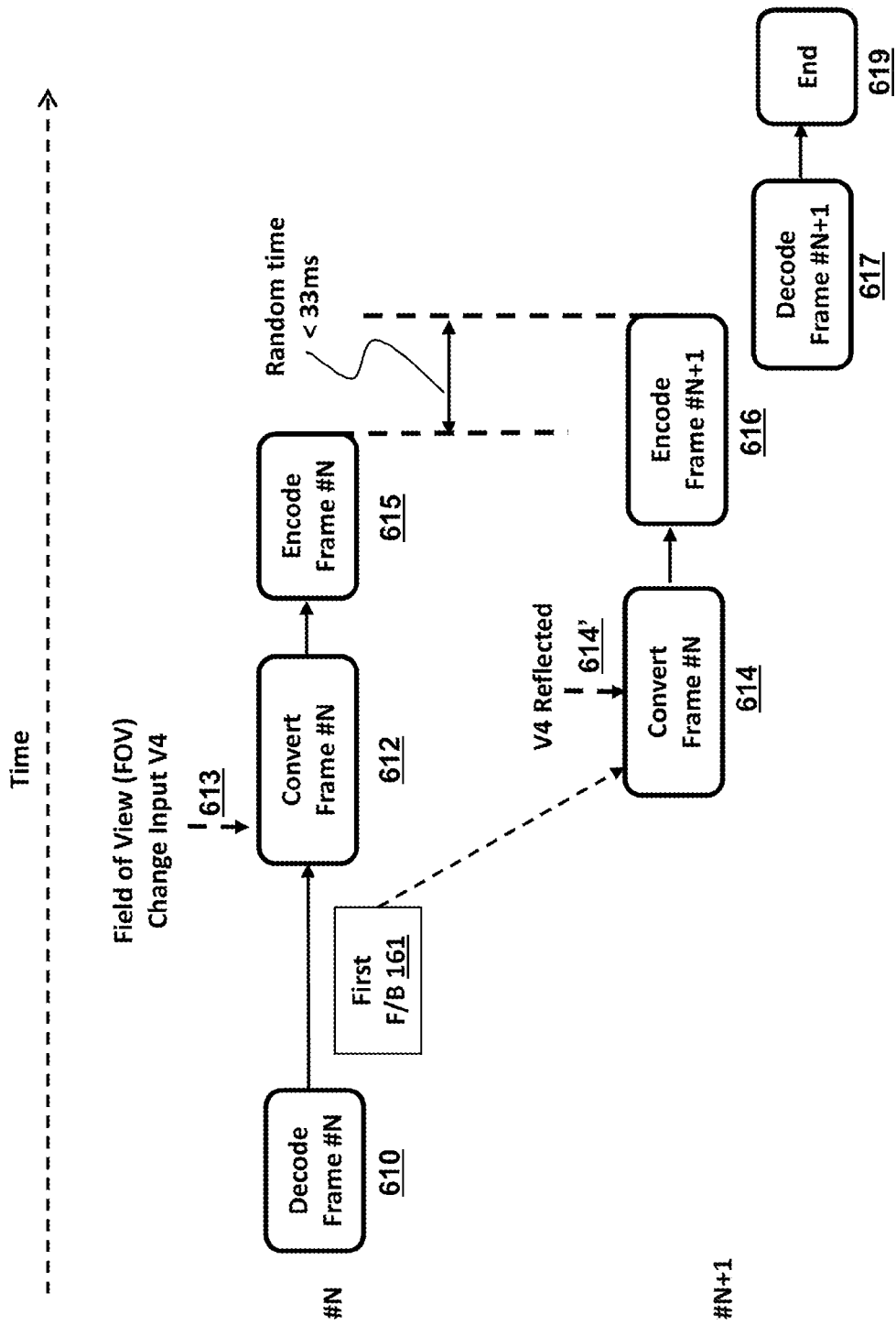
Figure 6C:
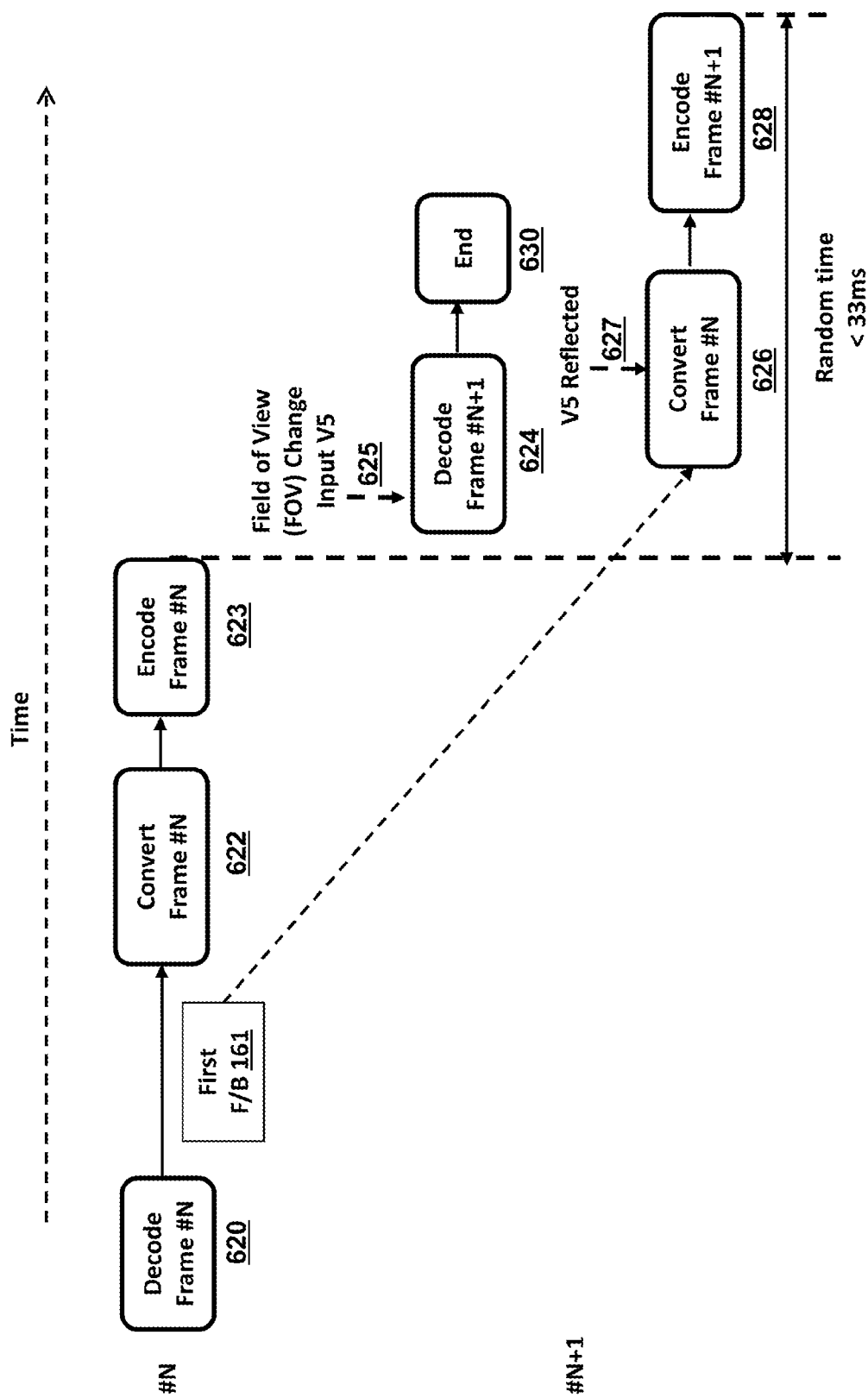

FIGS. 6A, 6B and 6C are block diagrams of an example FOV based post processing method for reduced latency encoding in an example VR video streaming system. Referring to FIG. 6A, for example, a GPU decodes frame #N (601)//convert spherical image frame data of frame #N to equirectangular image frame data (604)/encodes frame #N (606), and subsequently decodes frame #N+1 (607) and so on. In some implementations, if a processor (e.g., processor 101 in FIG. 3A) of the video streaming system 100 receives (602) a third FOV change input V3 (relating to a third FOV) from the client device before the conversion of frame #N (604), the GPU can reflect (605) the first FOV change input during the conversion of frame #N (604). In some implementations, the GPU can reflect (605) the third FOV change input V3 by converting the spherical image frame data associated with frame #N to equirectangular image frame data that correspond to the third FOV of the spherical image frame represented by the frame #N spherical image frame data.

Referring to FIG. 6B, for example, a GPU decodes frame #N (610)//convert spherical image frame data of frame #N to equirectangular image frame data (612)/encodes frame #N (615), and subsequently decodes frame #N+1 (617). In some implementations, if the processor of the video streaming system 100 receives (613) a fourth FOV change input V4 (relating to a fourth FOV) from the client device during or after the conversion of frame #N (612), the GPU can reflect (614') the fourth FOV change input in the conversion (614) and encoding (616) for frame #N+1. In some implementations, instead of waiting until completion of decoding of frame #N+1 (617), the GPU can use the frame #N stored in the first frame buffer 161 to immediately convert the spherical image frame data of frame #N to equirectangular image frame data that correspond to the fourth FOV of the spherical image frame represented by the frame #N spherical image frame data (614). Subsequently, the GPU can encode the converted equirectangular image frame data for encoded frame #N+1 (616). Furthermore, after completion of decoding of frame #N+1 (617), the GPU can omit (619), i.e., do not carry out, further processing of frame #N+1 (e.g., conversion and encoding of frame #N+1) because the encoded frame #N+1 is already (or will be) available from other conversion (614) and encoding (616) operations. In this manner, the time gap between encoding completion of frame #N and that of frame #N+1 can be a random time less than 33 ms, thereby reducing the time for encoding the frames.

Referring to FIG. 6C, for example, a GPU decodes frame #N (620)//convert spherical image frame data of frame #N to equirectangular image frame data (622)/encodes frame #N (623), and subsequently decodes frame #N+1 (624). In some implementations, if the processor of the video streaming system 100 receives (625) a fifth FOV change input V5 (relating to a fifth FOV) from the client device during or after the decoding of frame #N+1 (624), the GPU can reflect (627) the fifth FOV change input in the conversion (626) and encoding (628) for frame #N+1. In some implementations, instead of waiting until completion of decoding of frame #N+1 (624), the GPU can use the frame #N stored in the first frame buffer 161 to immediately convert the spherical image frame data of frame #N to equirectangular image frame data that correspond to the fifth FOV of the spherical image frame represented by the frame #N spherical image frame data (626). Subsequently, the GPU can encode the converted equirectangular image frame data for encoded frame #N+1 (628). Furthermore, after completion of decoding of frame #N+1 (624), the GPU can omit (630), i.e., do not carry out, further processing of frame #N+1 (e.g., conversion and encoding of frame #N+1) because the encoded frame #N+1 is already (or will be) available from other conversion (626) and encoding (628) operations. In this manner, the time gap between encoding completion of frame #N and that of frame #N+1 can be a random time less than 33 ms, thereby reducing the time for encoding the frames.

Now, the flowchart in FIG. 4B will be described in more detail, referring to FIGS. 6A-6C. Referring to FIG. 4B, at stage 451, before converting the first spherical image frame data to equirectangular image frame data, the first processor 101 or GPU may determine whether the first information relating to the first FOV is received before the GPU has started converting the first spherical image frame data to the first equirectangular image frame data. For example, referring to FIG. 6A, the first processor 101 or GPU 102 determines that the third FOV change input V3 is received (602) before the GPU 102 has started converting (604) the spherical image frame data of frame #N to equirectangular image frame data of frame #N. On the other hand, referring to FIG. 6B, the first processor 101 or GPU 102 determines that the fourth FOV change input V4 is received (613) during or after the GPU 102 has started converting (612) the spherical image frame data of frame #N to equirectangular image frame data of frame #N.

At stage 452, in response to determination that the first information relating to the first FOV is received before the GPU has started converting the first spherical image frame data to the first equirectangular image frame data, the GPU of the video server may convert the first spherical image frame data stored in the first frame buffer memory (e.g., the frame buffer 161 in FIG. 3A) to first equirectangular image frame data that correspond to the first FOV of the first spherical image frame represented by the first spherical image frame data. For example, referring to FIG. 6A, because the third FOV change input V3 is received (602) before the GPU has started converting (604) the spherical image frame data of frame #N to equirectangular image frame data of frame #N, the GPU converts (604) the spherical image frame data of frame #N to the equirectangular image frame data of frame #N that correspond to the third FOA change input V3 as reflected (605) in the spherical image frame of frame #N.

Referring to FIG. 4B, the GPU of the video server may decode second spherical image frame data representing a second spherical image frame of the video subsequent to the first spherical image frame, and store the decoded second spherical image frame data in the first frame buffer memory (e.g., the first buffer 161 in FIG. 3A). For example, referring to FIG. 6B, the GPU of the video server decodes (617) frame #N+1 (that is subsequent to frame #N) and stores spherical image frame data representing the decoded frame #N+1 in the first buffer 161. At stage 453, the first processor 101 or GPU of the video server may determine that the first FOV information is received before GPU has stored the second spherical image frame data in the first frame buffer memory. For example, referring to FIG. 6B, it is determined that the fourth FOV change input V4 is received (613) before GPU has stored the spherical image frame data of frame #N+1 in the first frame buffer 161 (because the storing occurs after the decoding (617) of frame #N+1). Similarly, referring to FIG. 6C, it is determined that the fifth FOV change input V5 is received (625) before GPU has stored the spherical image frame data of frame #N+1 in the first frame buffer 161 (because the storing occurs after the decoding (624) of frame #N+1).

At stage 454, in response to determination that the first information relating to the first FOV is received before the GPU of the video server has stored the second spherical image frame data in the first frame buffer memory, the GPU of the video server may convert the first spherical image frame data stored in the first frame buffer memory to second equirectangular image frame data that correspond to the second FOV of the first spherical image frame represented by the first spherical image frame data. For example, referring to FIG. 6B, in response to determination that the fourth FOV change input V4 is received before the GPU of the video server has stored the spherical image frame data of frame #N+1 in the first frame buffer 161, the GPU converts (614) the spherical image frame data of frame #N, which is stored in the first buffer 161 at the time of conversion (614), to the equirectangular image frame data that correspond to the fourth FOV change input V4 as reflected (614') in the spherical image frame data of frame #N. Similarly, referring to FIG. 6C, in response to determination that the fifth FOV change input V5 is received before the GPU has stored the spherical image frame data of frame #N+1 in the first frame buffer 161, the GPU converts (626) the spherical image frame data of frame #N, which is stored in the first buffer 161 at the time of conversion (626), to the equirectangular image frame data that correspond to the fifth FOV change input V5 as reflected (627) in the spherical image frame data of frame #N. In some implementations, subsequent to the conversion of the first spherical image frame data at stage 454, the GPU may encode the converted equirectangular image frame data to second encoded image frame data so that a streaming server (e.g., the streaming server 140 in FIG. 3A) can stream, to the client device, only the encoded second equirectangular image frame data that correspond to the current FOV. For example, referring to FIG. 6B, subsequent to the conversion (614) of the spherical image frame data of frame #N, the GPU encodes (616) the converted equirectangular image frame data into encoded image frame data for frame #N+1. Similarly, referring to FIG. 6C, subsequent to the conversion (626) of the spherical image frame data of frame #N, the GPU encodes (628) the converted equirectangular image frame data into encoded image frame data for frame #N+1.

At stage 455, after decoding the decode second spherical image frame data, the GPU may omit conversion and encoding of the second spherical image frame data stored in the first frame buffer memory. For example, referring to FIG. 6B, after the decoding (617) of frame #N+1, the GPU omits further conversion and encoding of the spherical image frame data of frame #N+1 stored in the first frame buffer 161 because the encoded frame #N+1 is already (or will be) available from other conversion (614) and encoding (616) operations. Similarly, referring to FIG. 6C, after the decoding (624) of frame #N+1, the GPU omits further conversion and encoding of the spherical image frame data of frame #N+1 stored in the first frame buffer 161 because the encoded frame #N+1 is already (or will be) available from other conversion (626) and encoding (628) operations.

Figure 7:
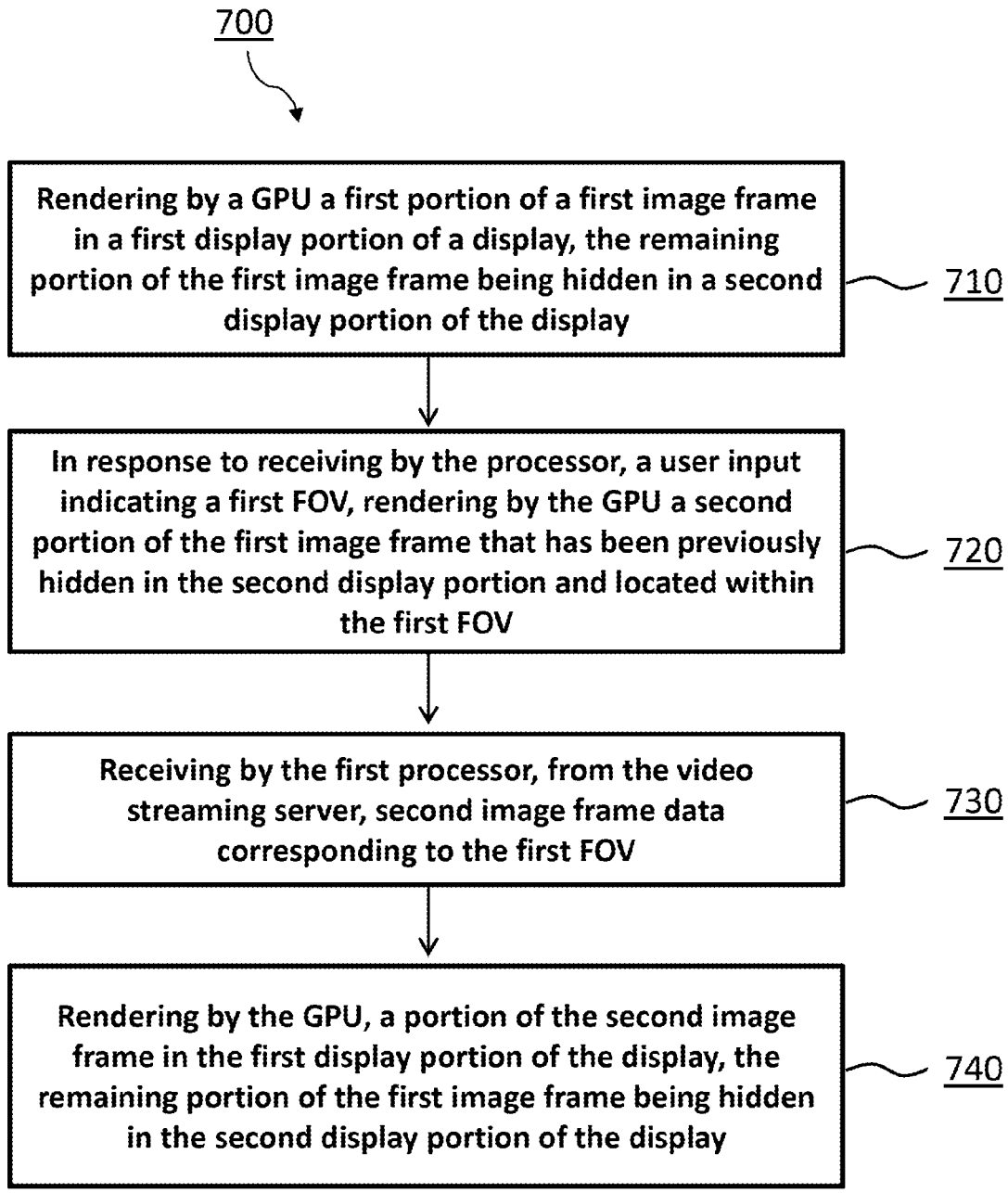
FIG. 7 is a flowchart showing operations of a video displaying method of a client device, according to some implementations.

FIG. 7 is a flowchart showing operations of a video displaying method 700 of a client device, according to some implementations. In broad overview, the method 700 begins with stage 710 in which a GPU (e.g., the GPU 370 in FIG. 2) of the client device (e.g., the client device 200A in FIGS. 1 and 3A) may render a first portion of the first image frame in a first display portion of a display, the remaining portion of the first image frame being hidden in a second display portion of the display. At stage 720, in response to receiving by a processor (e.g., the processor 310 in FIG. 2) of the client device, a user input indicating a first field of view (FOV), the GPU of the client device may render a second portion of the first image frame that has been previously hidden in the second display portion and located within the first FOV. At stage 730, the processor of the client device may transmit, to a video streaming server (e.g., the streamer 180 in FIG. 3A), information indicating the first FOV. At stage 740, in response to receiving, from the video streaming server, second image frame data representing a second image frame of the video and corresponding to the first FOV, the GPU may render a portion of the second image frame in the first display portion of the display, the remaining portion of the first image frame being hidden in the second display portion of the display.

Figure 8A:
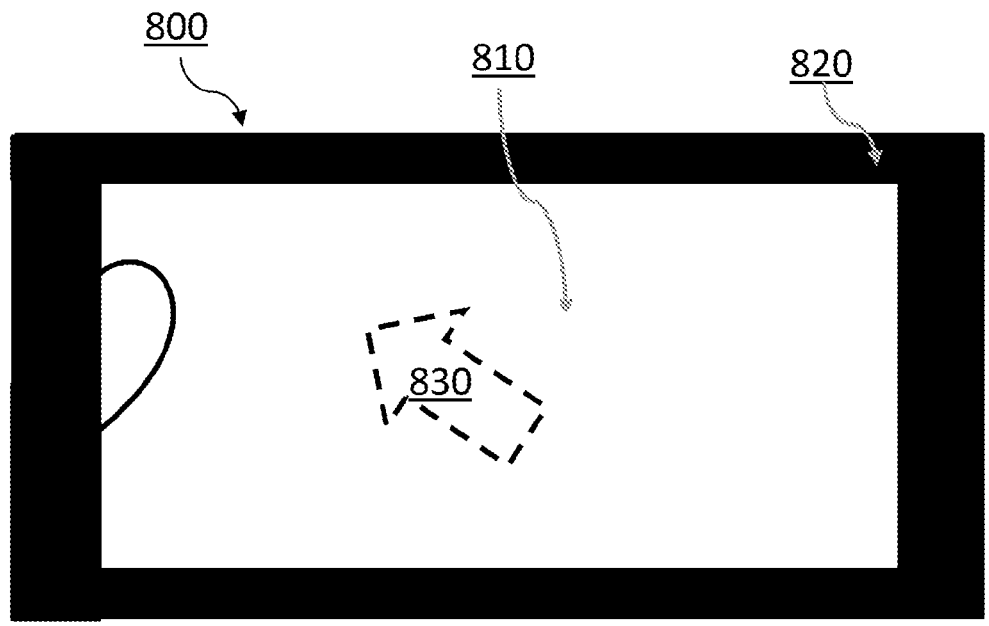
FIGS. 8A, 8B and 8C are example displays of an example client device displayed via an example video displaying method, according to some implementations.
Figure 8B:
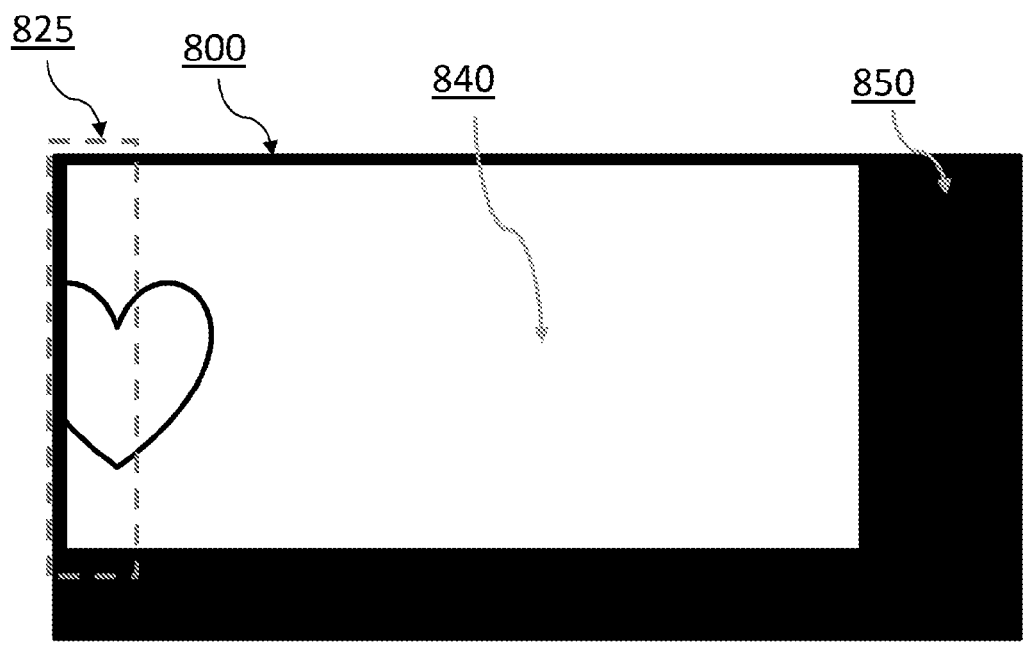
Figure 8C:
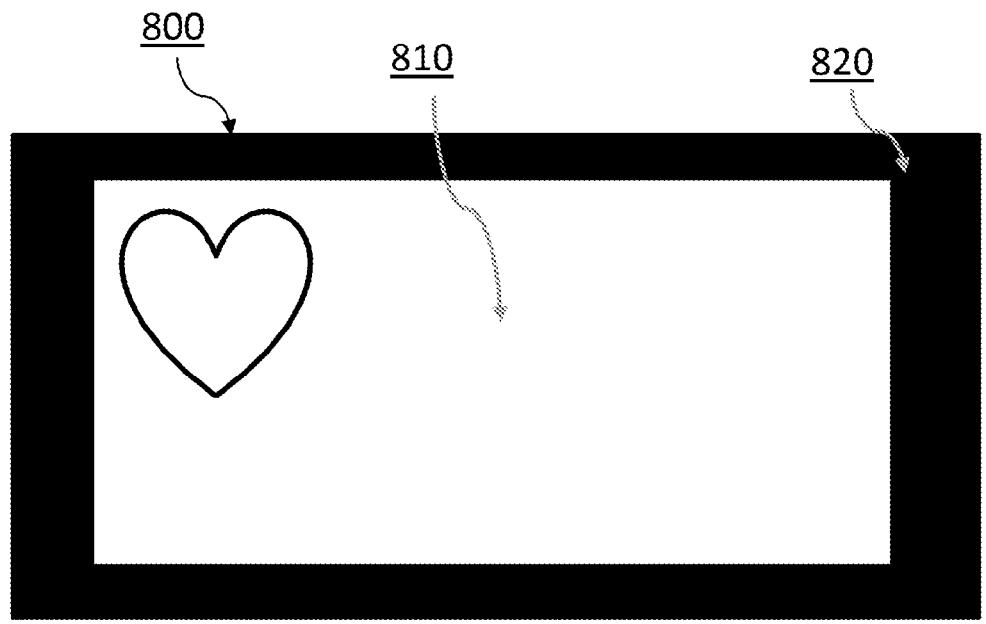

Now, the flowchart in FIG. 7 will be described in more detail, by referring to FIGS. 1-3 and 8A-8C. FIGS. 8A, 8B and 8C are example displays of an example client device displayed via an example video displaying method, according to some implementations.

At stage 710, a processor (e.g., the processor 310 in FIG. 2) of a client device (e.g., the client device 200A in FIGS. 1 and 3A) may receive, from a video streaming server (e.g., the streamer 180 in FIG. 3A), first image frame data representing a first image frame of the video. Referring to FIG. 8A, a GPU (e.g., the GPU 370 in FIG. 2) of the client device may render a first portion of the first image frame in a first display portion 810 of a display 800 of the client device, the remaining portion of the first image frame being hidden in a second display portion 820 of the display. In some implementations, the display 800 of the client device has at least the same size as the first image frame. In some implementations, the display 800 may have a rectangular shape. In some implementations, the display 800 may have other shapes, e.g., circular or polygonal shapes. The first display portion 810 may have a rectangular shape located at a center of the rectangular display 800. The second display portion 820 of the display may include at least one of left-side margin, right-side margin, top-side margin and bottom-side margin of the rectangular display 800.

At stage 720, referring to FIG. 8B, in response to receiving by the processor of the client device, a user input indicating a first field of view (FOV) (not shown), the GPU of the client device may render a second portion 825 of the first image frame that has been previously hidden in the second display portion and 820 located within the first FOV. For example, referring to FIG. 8B, the user of the client device changes his or her view angle in a direction 830, thereby indicating the first FOV. In some implementations, the client device can detect this view angle change and provide an FOV change input to the GPU of the client device so that the GPU can render the previously hidden second portion 825. In some implementations, in rendering the second portion 825 of the first image frame, the GPU of the client device may relocate a rendering area of the display 800 from the first display portion 810 (see FIG. 8A) to a third display portion 840 (see FIG. 8B) having the same shape as the first display portion 810 and including the second portion 825 of the first image frame.

At stage 730, the processor of the client device may transmit, to the video streaming server (e.g., the streamer 180 in FIG. 3A), information indicating the first FOV. In some implementations, the processor of the client device may receive, from the video streaming server, second image frame data representing a second image frame of the video and corresponding to the first FOV. In some implementations, the processor of the client device may also receive, from the video streaming server, corrected FOV information of the second image frame data.

At stage 740, referring to FIG. 8C, the GPU may render a portion of the second image frame in the first display portion 810 of the display 800, the remaining portion of the first image frame being hidden in the second display portion 820 of the display 800. The GPU of the client device may relocate the rendering area of the display from the third display portion 840 (see FIG. 8B) back to the first display portion 810 at the center of the display. The immediate rendering of the previously hidden portion 825 (see FIG. 8B) followed by the relocation of the display portion back to the center of the display will enable the user of the client device to be unaware of the difference between the frame image rendered on the third display portion 840 at stage 720 and the frame image rendered on the first display portion 810 at stage 740.

In some implementations, the VR video streaming system can provide following advantages. First, the VR video streaming system can effectively utilize computing power of the GPU (e.g., parallel computing power via multiple cores) in processing high resolution VR video data. Second, transmission of current FOV reflected video portion only can save huge network bandwidth requirement (e.g., 4K UHD requires 16~20 Mbps, while transmission of FOV video data only may need only 1~2 Mbps). Third, transmission of FOV reflected video portion only can improve both the user experience as well as streaming service cost. Fourth, the transmission of FOV reflected video portion only can provide low data rate transmission, thereby eliminating data buffering and reducing battery consumption of a client device. Fifth, the transmission of FOV reflected video portion only can also reduce cost of streaming service, because streaming service providers may need to pay per their network service usage. Sixth, transmission of FOV reflected video portion only also can prevent contents piracy. Partial streamed video data, received via transmission of FOV reflected video portion only, can only contain a portion of dynamically changed viewed angles, thereby preventing its contents from being illegally copied. Seventh, by changing rendering area of a display of the client device based on the current FOV, the client device can immediately provide the user with a video portion of changed view angle without a delay which would occur if providing a new video portion of changed view angle after receiving the new video portion from the video streaming server.

It should be noted that the term "example" or "exemplary" as used herein to describe various implementations is intended to indicate that such implementations are possible examples, representations, and/or illustrations of possible implementations (and such term is not intended to connote that such implementations are necessarily extraordinary or superlative examples).

The terms "coupled," "connected," and the like, as used herein, mean the joining of two members or components directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

The present disclosure contemplates methods, systems, and program products on any machine-readable media for accomplishing various operations. The examples of the present disclosure may be implemented using existing computer processors, or by a special purpose computer processor for an appropriate system, incorporated for this or another purpose, or by a hardwired system. Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other non-transitory medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

It is important to note that the construction and arrangement of the elements of the systems and methods as shown in the exemplary implementations are illustrative only. Although only a few implementations of the present disclosure have been described in detail, those skilled in the art who review this disclosure will readily appreciate that many modifications are possible without materially departing from the novel teachings and advantages of the subject matter recited. For example, elements shown as integrally formed may be constructed of multiple parts or elements. Accordingly, all such modifications are intended to be included within the scope of the present inventions. Other substitutions, modifications, changes, and omissions may be made in the design, operating conditions, and arrangement of the preferred and other exemplary implementations without departing from scope of the present disclosure or from the spirit of the appended claims.

What is claimed:

1. A method comprising:
initiating, by one or more processors, conversion of a first spherical image associated with a first field of view into a first equirectangular image associated with the first field of view and initiating storage of the first equirectangular image;
detecting, by one or more processors, a switch from the first field of view to a second field of view after the initiating of the conversion of the first spherical image but before completion of the storage of the first equirectangular image; and
converting, by one or more processors, the first spherical image associated with the first field of view into a second equirectangular image associated with the second field of view and storing the second equirectangular image instead of the first equirectangular image.

2. The method of claim 1, further comprising:
omitting conversion of a second spherical image that corresponds to the second field of view into the second equirectangular image associated with the second field of view in response to the detecting of the switch to the second field of view occurring after the initiating of the conversion of the first spherical image into the first equirectangular image but before completion of the storage of the first equirectangular image.

3. The method of claim 1, wherein:
the converting of the first spherical image associated with the first field of view into the second equirectangular image associated with the second field of view is performed in lieu of converting a second spherical image associated with the second field of view into the second equirectangular image associated with the second field of view.

4. The method of claim 1, further comprising:
determining that the detecting of the switch from the first field of view to the second field of view occurred after the initiating of the conversion of the first spherical image into the first equirectangular image but before completion of the storage of the first equirectangular image.

5. The method of claim 1, further comprising:
accessing the first spherical image associated with the first field of view from a source from which a second spherical image associated with the second field of view is accessible; and
omitting access of the second spherical image associated with the second field of view in response to the switch from the first field of view to the second field of view being detected after the initiating of the conversion of the first spherical image into the first equirectangular image but before completion of the storage of the first equirectangular image.

6. The method of claim 1, further comprising:
in response to the switch from the first field of view to the second field of view being detected after the initiating of the conversion of the first spherical image into the first equirectangular image but before completion of the storage of the first equirectangular image, providing the second equirectangular image associated with the second field of view to a device, the second equirectangular image being generated by converting the first spherical image associated with the first field of view in lieu of being generated by converting a second spherical image associated with the second field of view.

7. The method of claim 1, wherein:
the first field of view is specified by a first range of azimuth angles and a first range of pitch angles; and
the second field of view is specified by a second range of azimuth angles and a second range of pitch angles.

8. A non-transitory machine-readable storage medium comprising instructions that, when executed by one or more processors of a machine, cause the machine to perform operations comprising:
initiating conversion of a first spherical image associated with a first field of view into a first equirectangular image associated with the first field of view and initiating storage of the first equirectangular image;
detecting a switch from the first field of view to a second field of view after the initiating of the conversion of the first spherical image but before completion of the storage of the first equirectangular image; and
converting the first spherical image associated with the first field of view into a second equirectangular image associated with the second field of view and storing the second equirectangular image instead of the first equirectangular image.

9. The non-transitory machine-readable storage medium of claim 8, wherein the operations further comprise:
omitting conversion of a second spherical image that corresponds to the second field of view into the second equirectangular image associated with the second field of view in response to the detecting of the switch to the second field of view occurring after the initiating of the conversion of the first spherical image into the first equirectangular image but before completion of the storage of the first equirectangular image.

10. The non-transitory machine-readable storage medium of claim 8, wherein:
the converting of the first spherical image associated with the first field of view into the second equirectangular image associated with the second field of view is performed in lieu of converting a second spherical image associated with the second field of view into the second equirectangular image associated with the second field of view.

11. The non-transitory machine-readable storage medium of claim 8, wherein the operations further comprise:
determining that the detecting of the switch from the first field of view to the second field of view occurred after the initiating of the conversion of the first spherical image into the first equirectangular image but before completion of the storage of the first equirectangular image.

12. The non-transitory machine-readable storage medium of claim 8, wherein the operations further comprise:
accessing the first spherical image associated with the first field of view from a source from which a second spherical image associated with the second field of view is accessible; and
omitting access of the second spherical image associated with the second field of view in response to the switch from the first field of view to the second field of view being detected after the initiating of the conversion of the first spherical image into the first equirectangular image but before completion of the storage of the first equirectangular image.

13. The non-transitory machine-readable storage medium of claim 8, wherein the operations further comprise:

in response to the switch from the first field of view to the second field of view being detected after the initiating of the conversion of the first spherical image into the first equirectangular image but before completion of the storage of the first equirectangular image, providing the second equirectangular image associated with the second field of view to a device, the second equirectangular image being generated by converting the first spherical image associated with the first field of view in lieu of being generated by converting a second spherical image associated with the second field of view.

14. The non-transitory machine-readable storage medium of claim 8, wherein:

the first field of view is specified by a first range of azimuth angles and a first range of pitch angles; and the second field of view is specified by a second range of azimuth angles and a second range of pitch angles.

15. A system comprising:

one or more processors; and a memory storing instructions that, when executed by at least one processor among the one or more processors, cause the system to perform operations comprising:

initiating conversion of a first spherical image associated with a first field of view into a first equirectangular image associated with the first field of view and initiating storage of the first equirectangular image;

detecting a switch from the first field of view to a second field of view after the initiating of the conversion of the first spherical image but before completion of the storage of the first equirectangular image; and converting the first spherical image associated with the first field of view into a second equirectangular image associated with the second field of view and storing the second equirectangular image instead of the first equirectangular image.

16. The system of claim 15, wherein the operations further comprise:

omitting conversion of a second spherical image that corresponds to the second field of view into the second equirectangular image associated with the second field of view in response to the detecting of the switch to the second field of view occurring after the initiating of the conversion of the first spherical image into the first equirectangular image but before completion of the storage of the first equirectangular image.

17. The system of claim 15, wherein:

the converting of the first spherical image associated with the first field of view into the second equirectangular image associated with the second field of view is performed in lieu of converting a second spherical image associated with the second field of view into the second equirectangular image associated with the second field of view.

18. The system of claim 15, wherein the operations further comprise:

determining that the detecting of the switch from the first field of view to the second field of view occurred after the initiating of the conversion of the first spherical image into the first equirectangular image but before completion of the storage of the first equirectangular image.

19. The system of claim 15, wherein the operations further comprise:

accessing the first spherical image associated with the first field of view from a source from which a second spherical image associated with the second field of view is accessible; and omitting access of the second spherical image associated with the second field of view in response to the switch from the first field of view to the second field of view being detected after the initiating of the conversion of the first spherical image into the first equirectangular image but before completion of the storage of the first equirectangular image.

20. The system of claim 15, wherein the operations further comprise:

in response to the switch from the first field of view to the second field of view being detected after the initiating of the conversion of the first spherical image into the first equirectangular image but before completion of the storage of the first equirectangular image, providing the second equirectangular image associated with the second field of view to a device, the second equirectangular image being generated by converting the first spherical image associated with the first field of view in lieu of being generated by converting a second spherical image associated with the second field of view.

\* \* \* \* \*